United States Patent [19]
Bealkowski et al.

[11] Patent Number: 5,826,075
[45] Date of Patent: Oct. 20, 1998

[54] AUTOMATED PROGRAMMABLE FIREWARE STORE FOR A PERSONAL COMPUTER SYSTEM

[75] Inventors: Richard Bealkowski, Delray Beach; Ralph Murray Begun, Boca Raton, both of Fla.

[73] Assignee: International Business Machines Corporation, Armonk, N.Y.

[21] Appl. No.: 799,486

[22] Filed: Nov. 27, 1991

Related U.S. Application Data

[63] Continuation-in-part of Ser. No. 777,844, Oct. 16, 1991.

[51] Int. Cl.$^6$ ..................................................... G06F 17/30
[52] U.S. Cl. ....................... 395/600; 380/4; 364/DIG. 1; 364/283.1
[58] Field of Search ..................................... 395/800, 700, 395/425, 600; 364/927.82; 371/19; 380/4

[56] References Cited

U.S. PATENT DOCUMENTS

| | | | |
|---|---|---|---|
| 4,430,727 | 2/1984 | Moore et al. | 395/442 |
| 4,456,993 | 6/1984 | Taniguchi et al. | 395/182.04 |
| 4,607,332 | 8/1986 | Goldberg | 395/463 |
| 4,758,988 | 7/1988 | Kuo | 365/189 |
| 4,802,117 | 1/1989 | Chrosny et al. | 395/182.03 |
| 4,811,303 | 3/1989 | Hirai | 365/189 |
| 4,823,252 | 4/1989 | Horst et al. | 395/182.05 |
| 4,893,279 | 1/1990 | Rahman et al. | 365/230.03 |
| 4,937,861 | 6/1990 | Cummins | 380/2 |
| 4,965,828 | 10/1990 | Ergott, Jr. et al. | 380/50 |
| 5,007,082 | 4/1991 | Cummins | 380/4 |
| 5,021,963 | 6/1991 | Brown et al. | 364/464.02 |
| 5,022,077 | 6/1991 | Bealkowski et al. | 380/4 |
| 5,032,981 | 7/1991 | Bril et al. | 395/421.1 |
| 5,097,445 | 3/1992 | Yamauchi | 365/195 |
| 5,128,995 | 7/1992 | Arnold et al. | 380/4 |
| 5,133,081 | 7/1992 | Mayo | 455/18 |
| 5,181,206 | 1/1993 | Hashiguchi | 371/21.5 |
| 5,210,954 | 5/1993 | Beaverton et al. | 395/500 |
| 5,237,379 | 8/1993 | Cwiakala et al. | 355/311 |
| 5,237,690 | 8/1993 | Bealkowski et al. | 395/700 |
| 5,239,637 | 8/1993 | Davis et al. | 395/492 |
| 5,271,012 | 12/1993 | Blaum et al. | 395/182.04 |
| 5,388,267 | 2/1995 | Chan et al. | 395/700 |

OTHER PUBLICATIONS

Intel, "Flash Memories", *Memory Products 1991*, pp. 6-1-6-420.

*Primary Examiner*—Wayne Amsbury

[57] ABSTRACT

An automated programmable firmware store for a personal computer system includes a plurality of nonvolatile alterable electronic memories connected in a mutually paralleled circuit arrangement. The memories are connected to a means for automatically controlling the memories to read firmware from and write firmware into the electronic memories, and to write-protect at least one of the memories. Any memory can be write-protected as initially selected by the automatic control means. The initial selection can be changed easily to write-protect another of the memories. The firmware in one memory includes code for checking the validity of firmware stored in another memory, and for selecting one or the other of the memories dependent upon a version code of the firmware. The control means also includes an update code for updating the firmware in a selected memory. The automated store further includes means for allowing the computer system to recover automatically from invalid firmware stored in one of the memories.

23 Claims, 35 Drawing Sheets

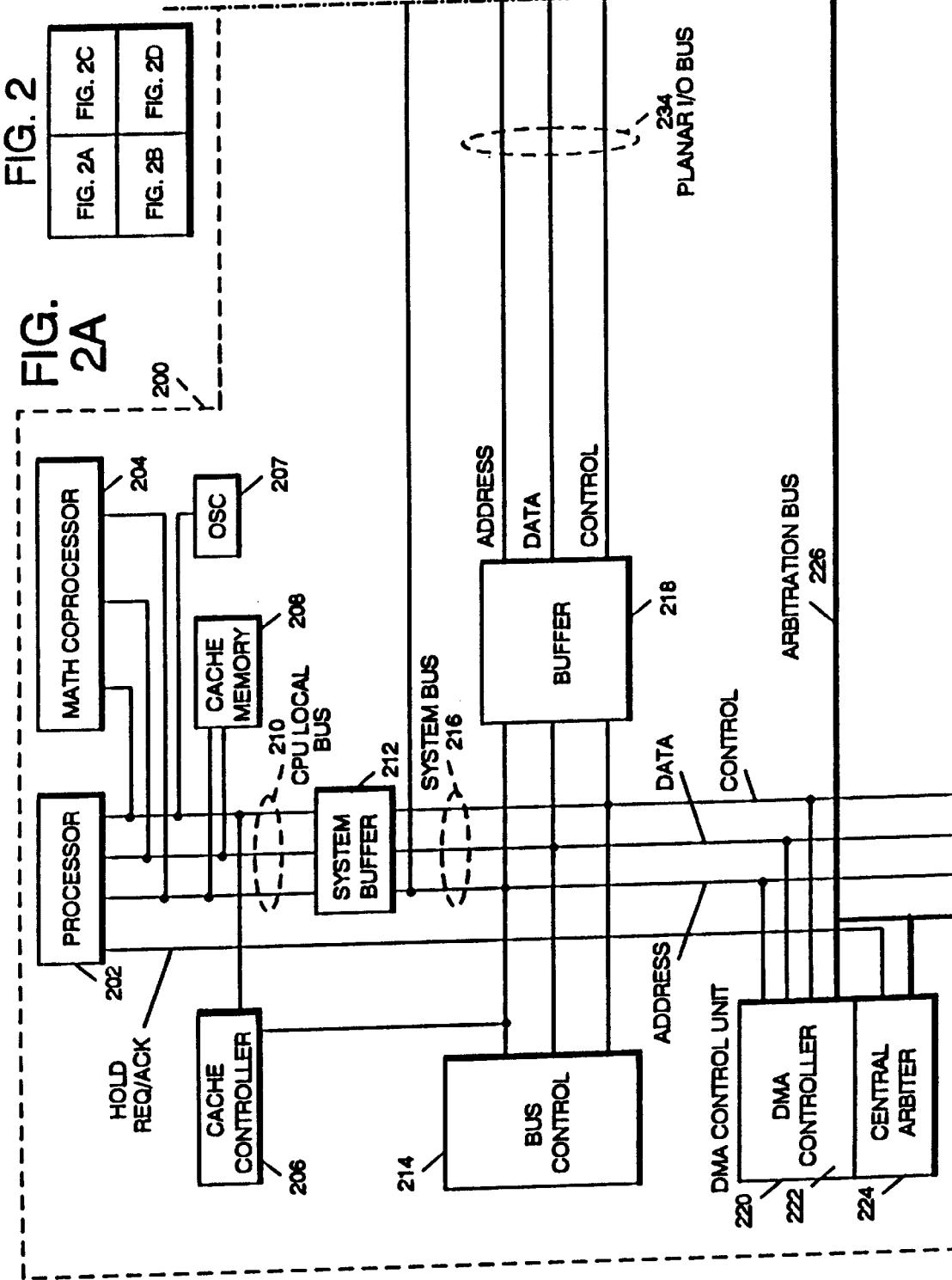

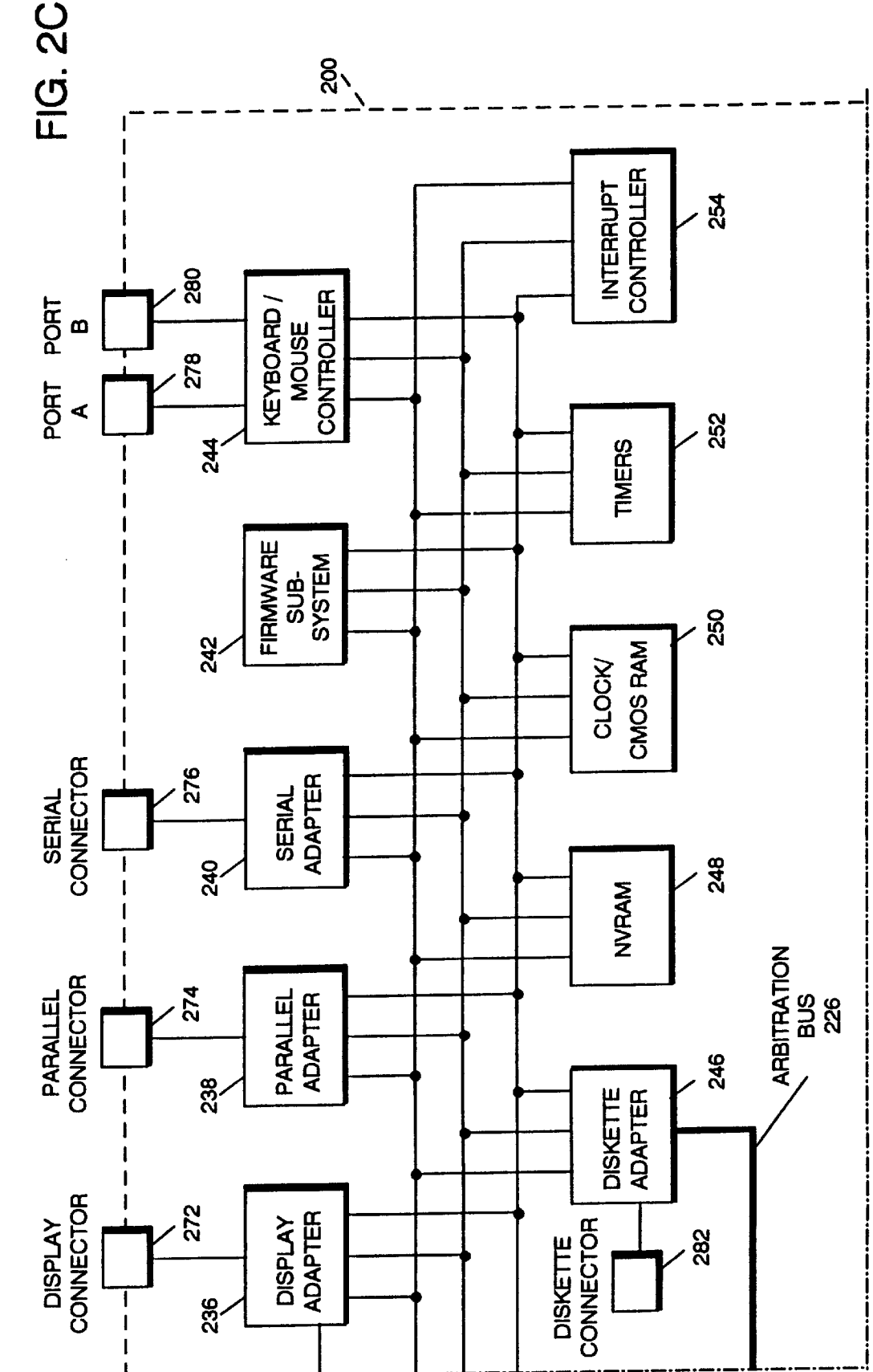

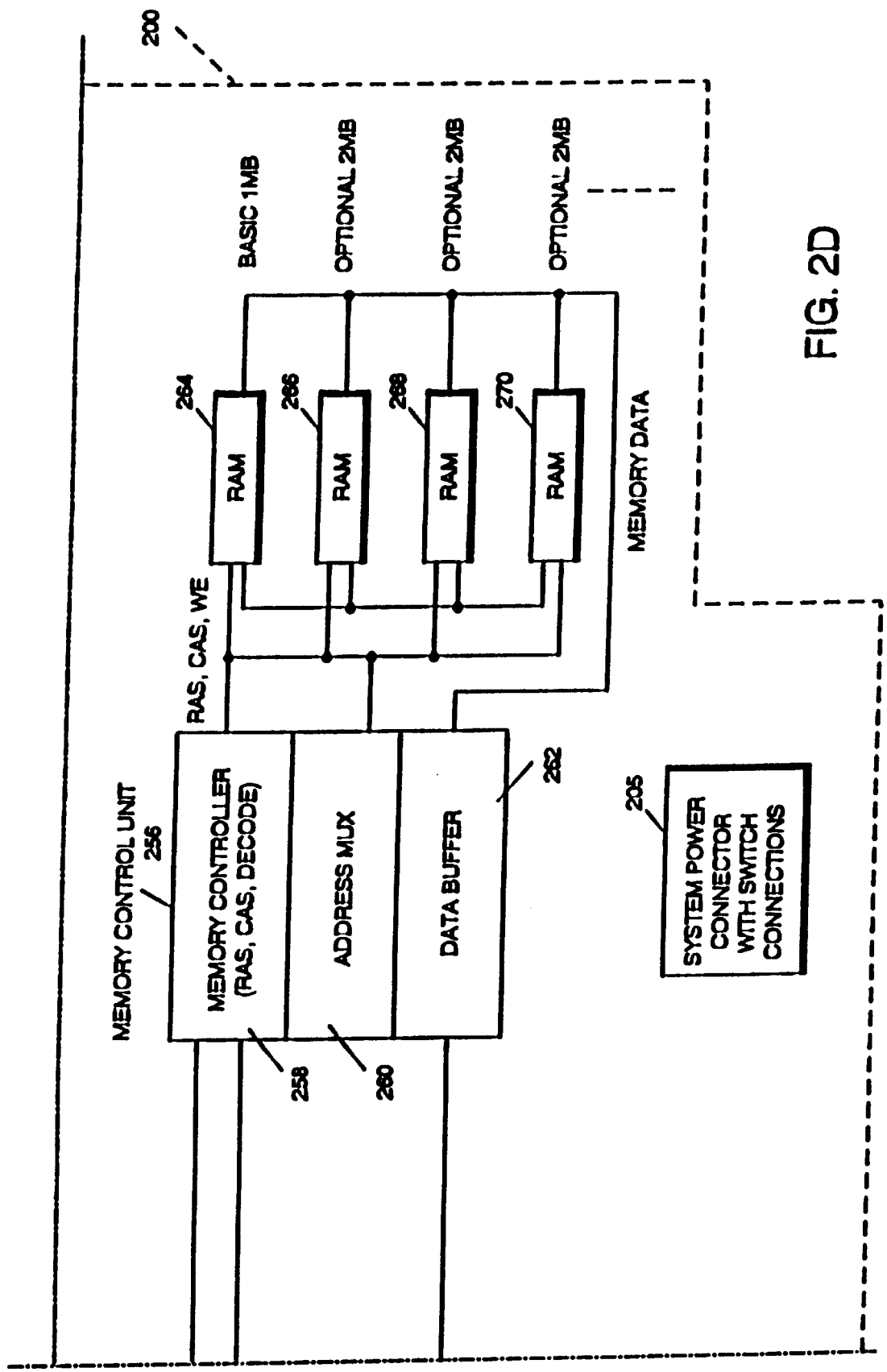

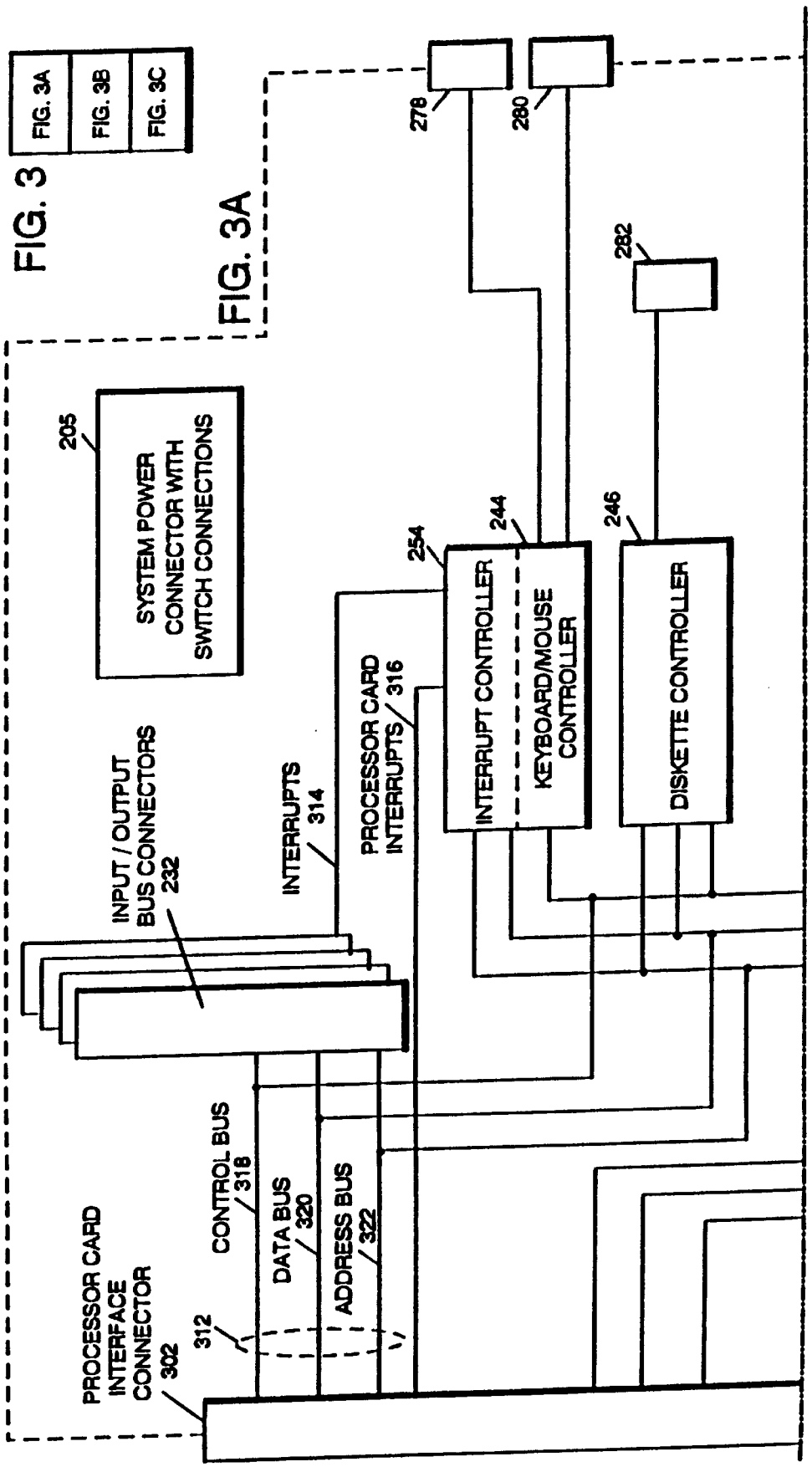

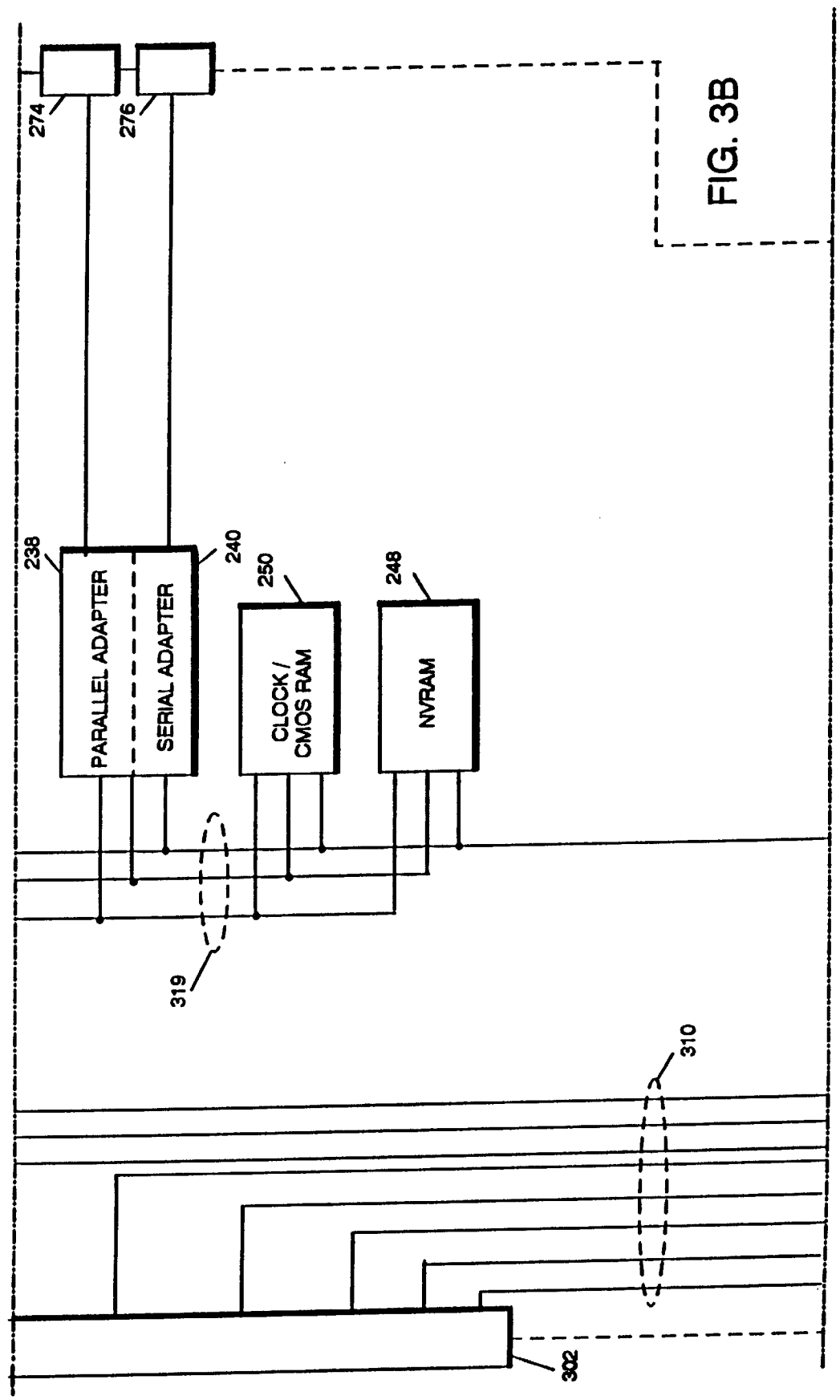

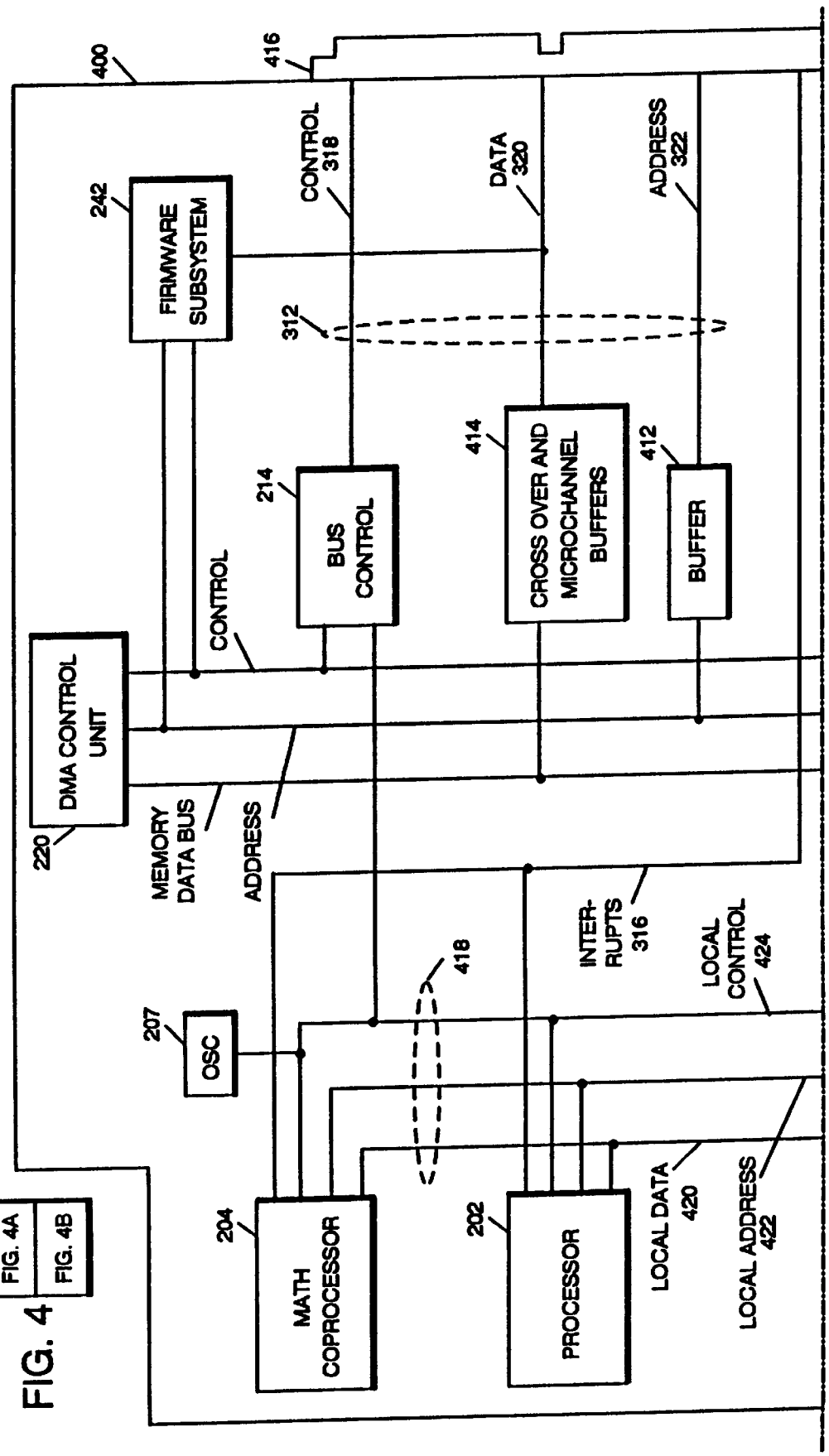

FIG. 5D

| ROW | SIGNAL | | | READ | | WRITE | | COMMENT |
|---|---|---|---|---|---|---|---|---|
| | BSP | ALTBANK | WAE | BANK 0 | BANK 1 | BANK 0 | BANK 1 | |
| 1 | 0 | 1 | 0 | YES | NO | NO | NO | POWER-ON DEFAULT READ BANK 0 |
| 2 | 1 | 1 | 0 | NO | YES | NO | NO | READ BANK 1 |
| 3 | 1 | 0 | 0 | YES | NO | YES | NO | BANK 0 UPDATES ENABLED |
| 4 | 0 | 0 | 0 | NO | YES | NO | YES | BANK 1 UPDATES ENABLED |
| 5 | 0 | 1 | 1 | YES | NO | NO | NO | UPDATES INHIBITED |
| 6 | 1 | 1 | 1 | NO | YES | NO | NO | UPDATES INHIBITED |
| 7 | 1 | 0 | 1 | YES | NO | NO | NO | UPDATES INHIBITED |
| 8 | 0 | 0 | 1 | NO | YES | NO | NO | UPDATES INHIBITED |

NOTE: TABLE DATA ASSUMES WRSEL IS ENABLED BEFORE A WRITE IS ATTEMPTED

FIG. 6D1

FIG. 6D2
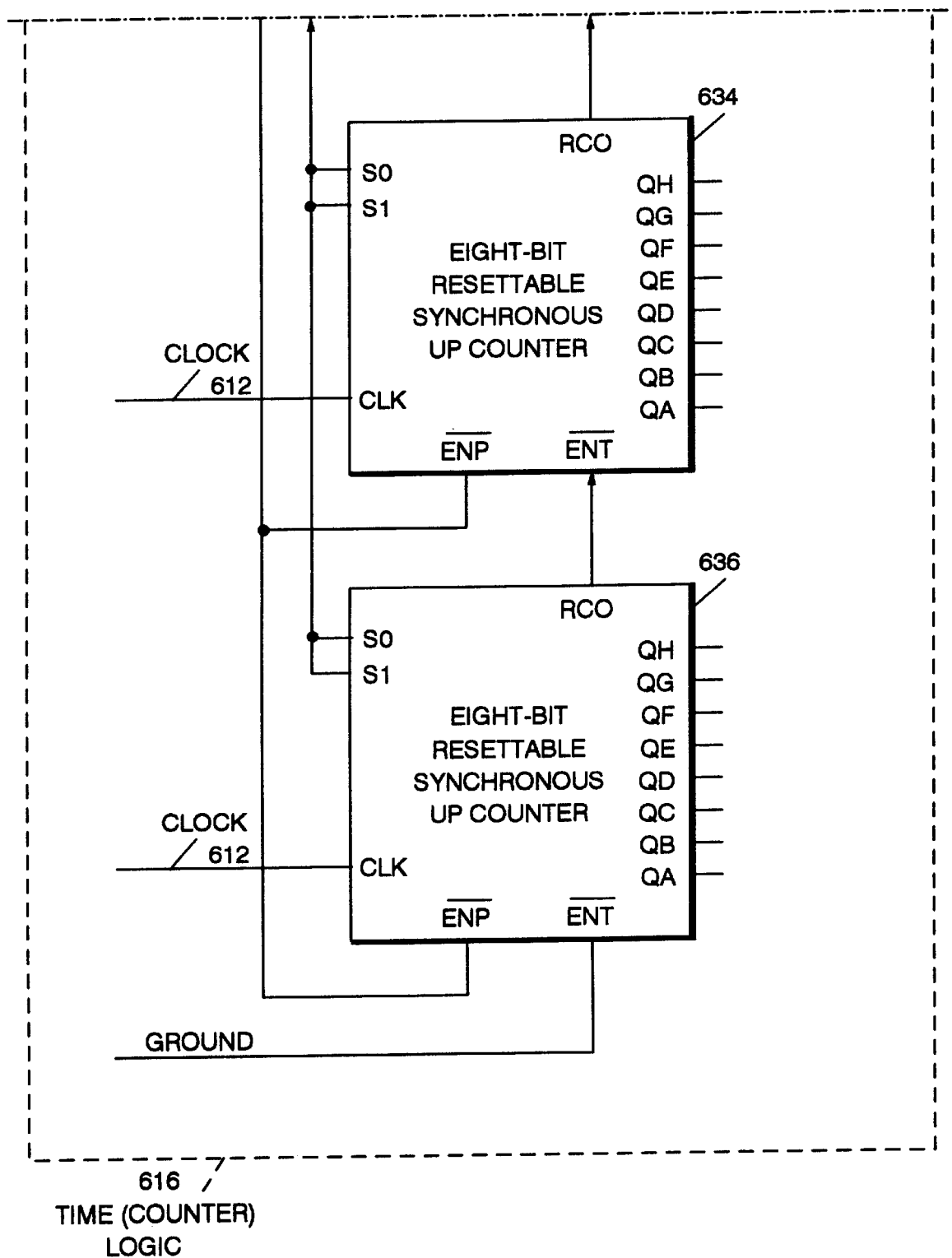

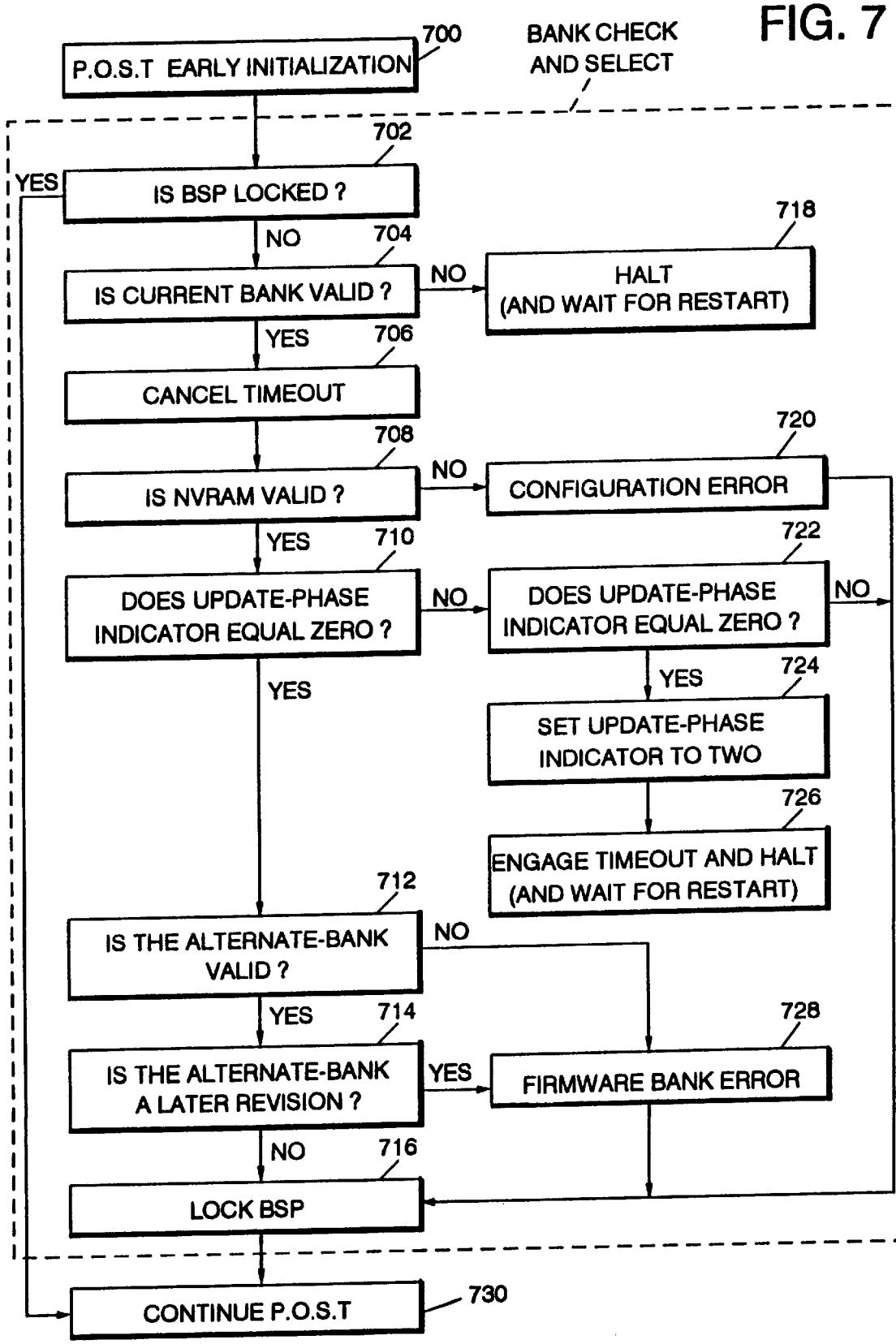

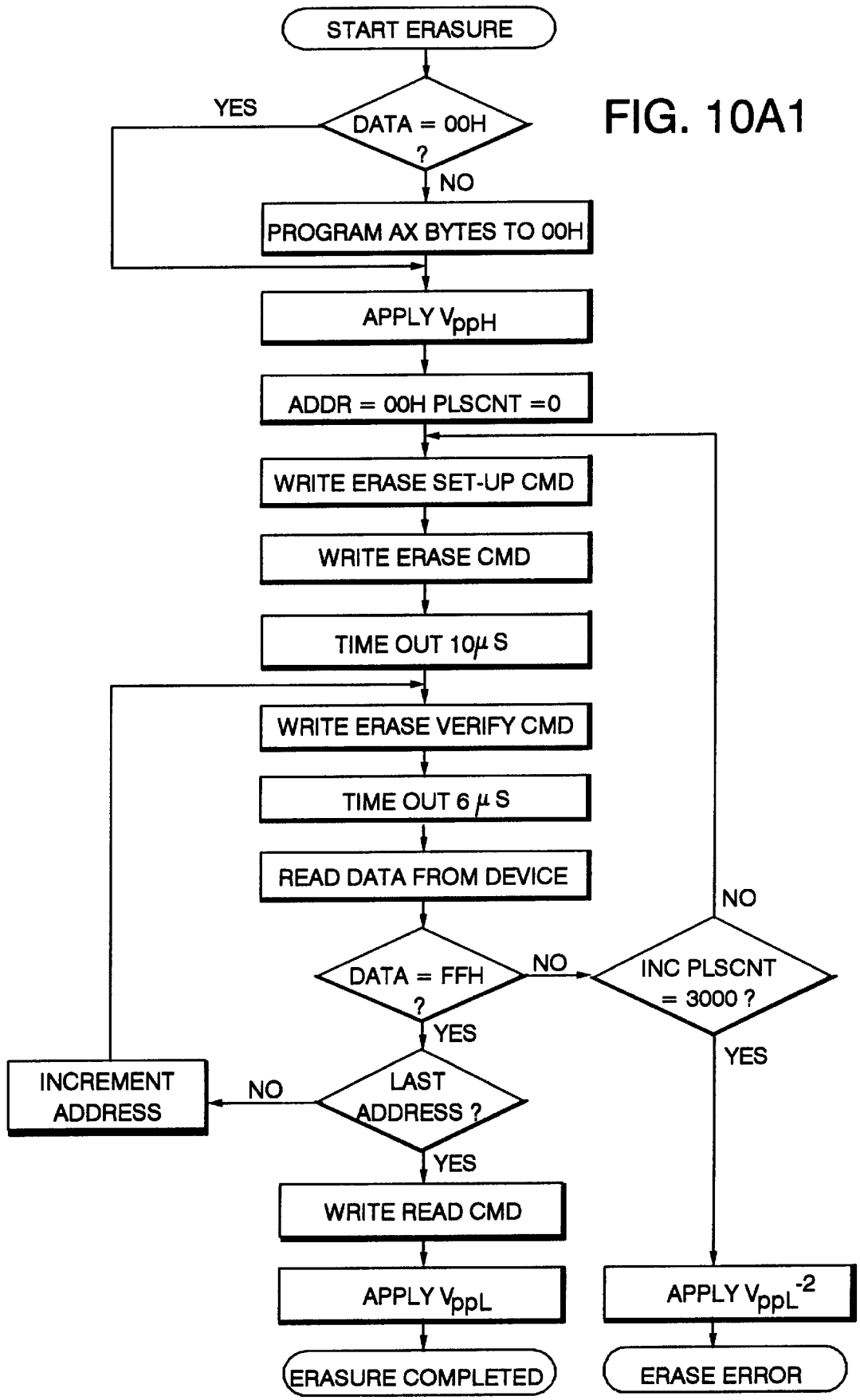
FIG. 10A1

FIG. 10A2

| BUS OPERATION | COMMAND | COMMENTS |
|---|---|---|
| | | ENTIRE MEMORY MUST = 00H BEFORE ERASURE |
| | | USE QUICK-PULSE PROGRAMMING™ ALGORITHM (FIGURE 5) |
| STANDBY | | WAIT FOR $V_{pp}$ RAMP TO $V_{ppH}$ |
| | | INITIALIZE ADDRESSES AND PULSE-COUNT |
| WRITE | SET-UP ERASE | DATA = 20H |
| WRITE | ERASE | DATA = 20H |
| STANDBY | | DURATION OF ERASE OPERATION ($t_{WHWH2}$) |
| WRITE | ERASE VERIFY | ADDR = BYTE TO VERIFY; DATA = A0H; STOPS ERASE OPERATION |
| STANDBY | | $t_{WHGL}$ |
| READ | | READ BYTE TO VERIFY ERASURE |
| STANDBY | | COMPARE OUTPUT TO FFH INCREMENT PULSE-COUNT |
| WRITE | READ | DATA = 00H, RESETS THE REGISTER FOR READ OPERATIONS |
| STANDBY | | WAIT FOR $V_{pp}$ RAMP TO $V_{ppL}$ |

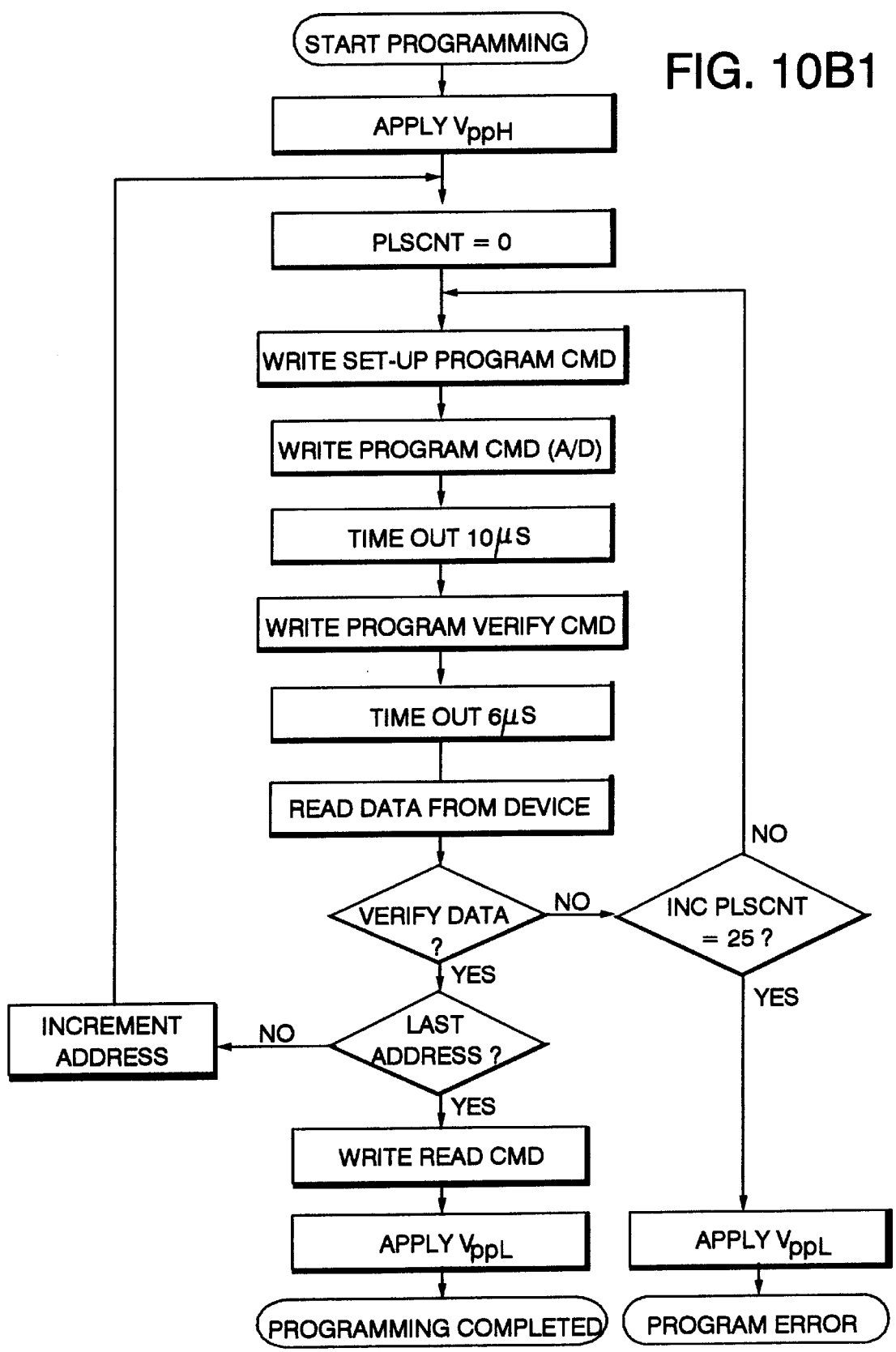
FIG. 10B1

FIG. 10B2

| BUS OPERATION | COMMAND | COMMENTS |
|---|---|---|
| STANDBY | | WAIT FOR $V_{pp}$ RAMP TO $V_{ppH}$ |
| | | INITIALIZE PULSE-COUNT |
| WRITE | SET-UP PROGRAM | DATA = 40H |
| WRITE | PROGRAM | VALID ADDRESS/DATA |
| STANDBY | | DURATION OF PROGRAM OPERATION ($t$WHWH1) |
| WRITE | PROGRAM VERIFY | DATA C0H; STOPS PROGRAM OPERATION |
| STANDBY | | $t$WHGL |
| READ | | READ BYTE TO VERIFY PROGRAMMING |
| STANDBY | | COMPARE DATA OUTPUT TO DATA EXPECTED |
| WRITE | READ | DATA = 00H, RESETS THE REGISTER FOR READ OPERATIONS |
| STANDBY | | WAIT FOR $V_{pp}$ RAMP TO $V_{ppL}$ |

FIG. 11A1

FIG. 11A2
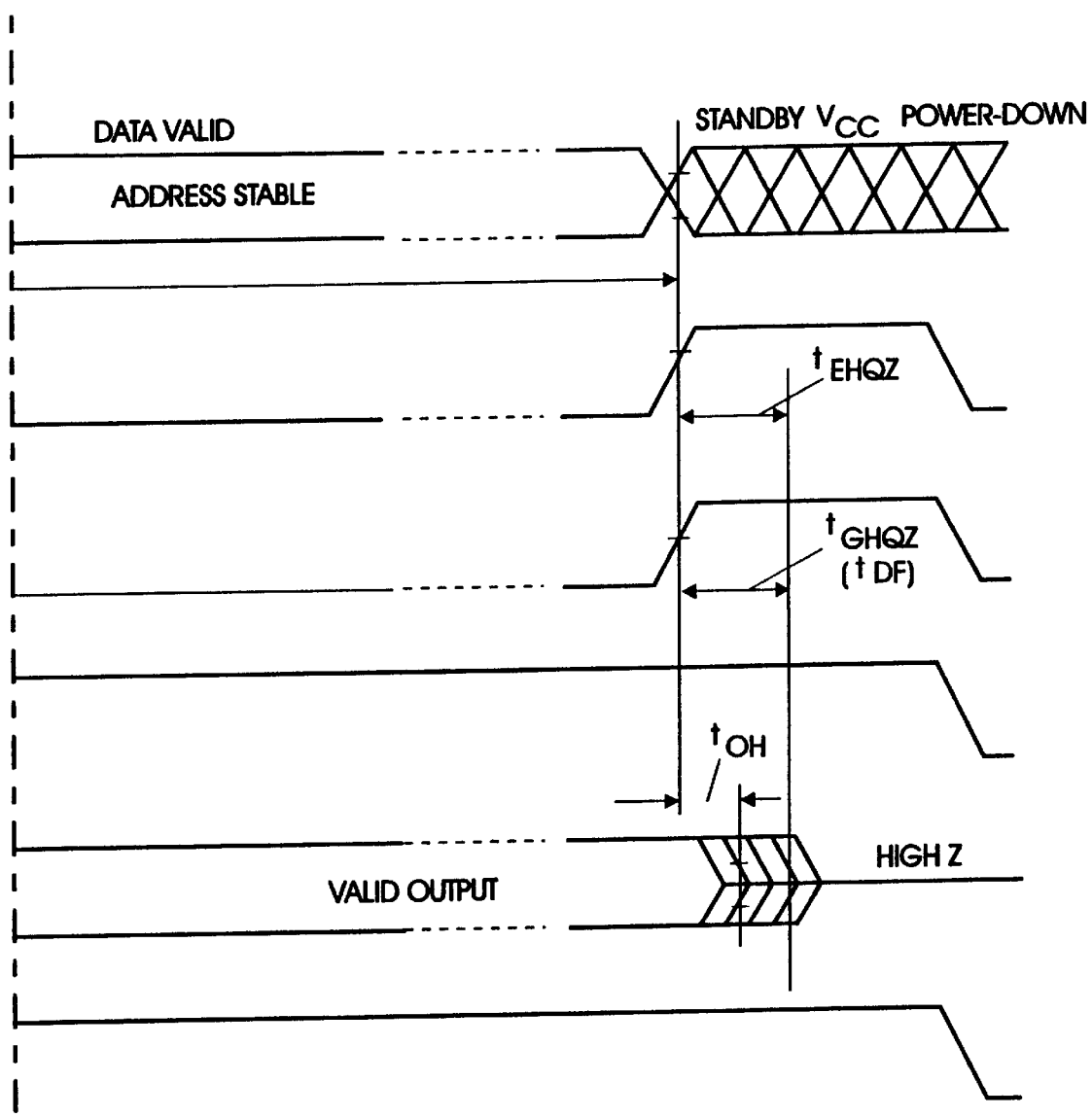

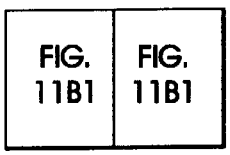
FIG. 11B
FIG. 11B1
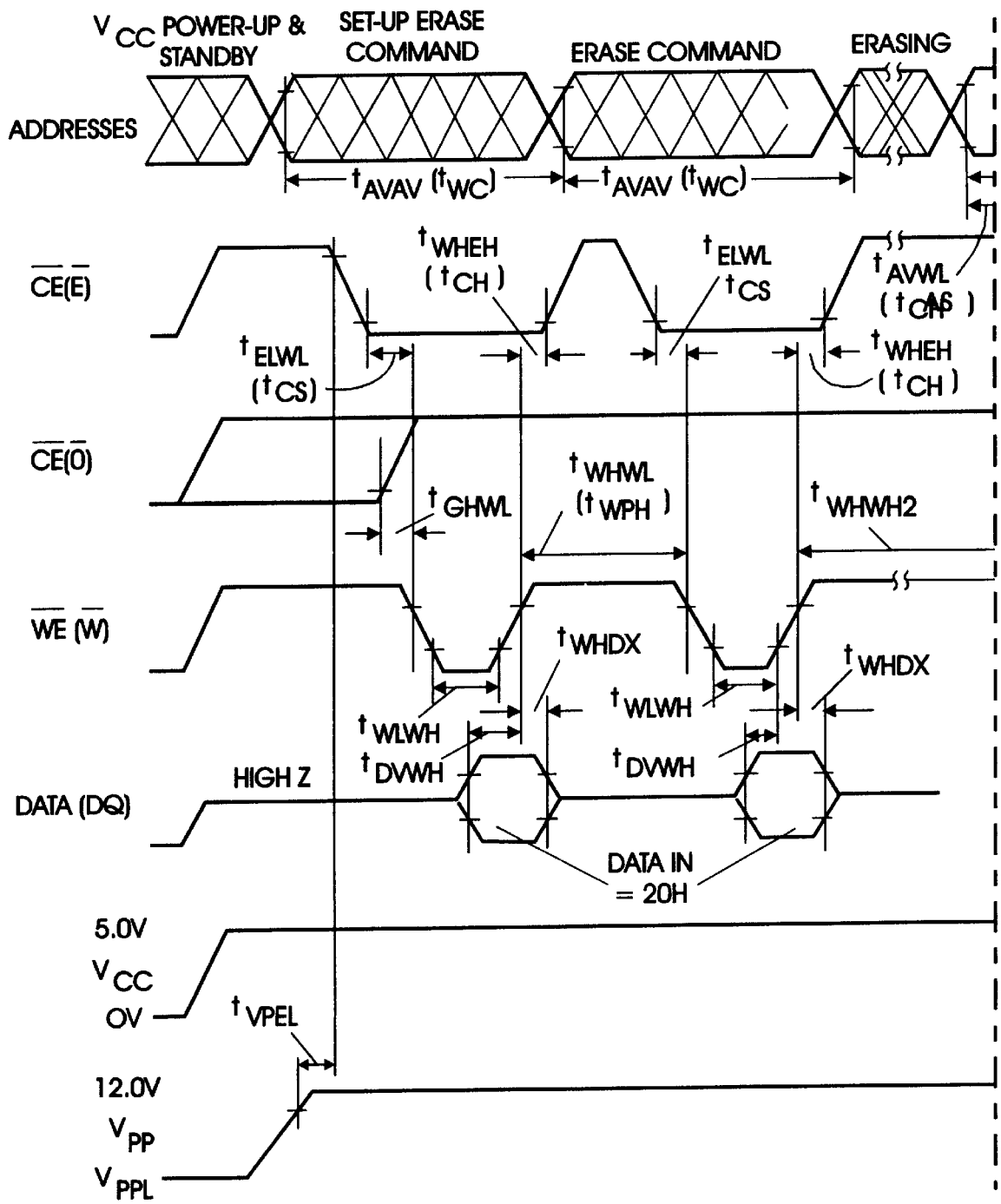
FIG. 11B1

FIG. 11B2
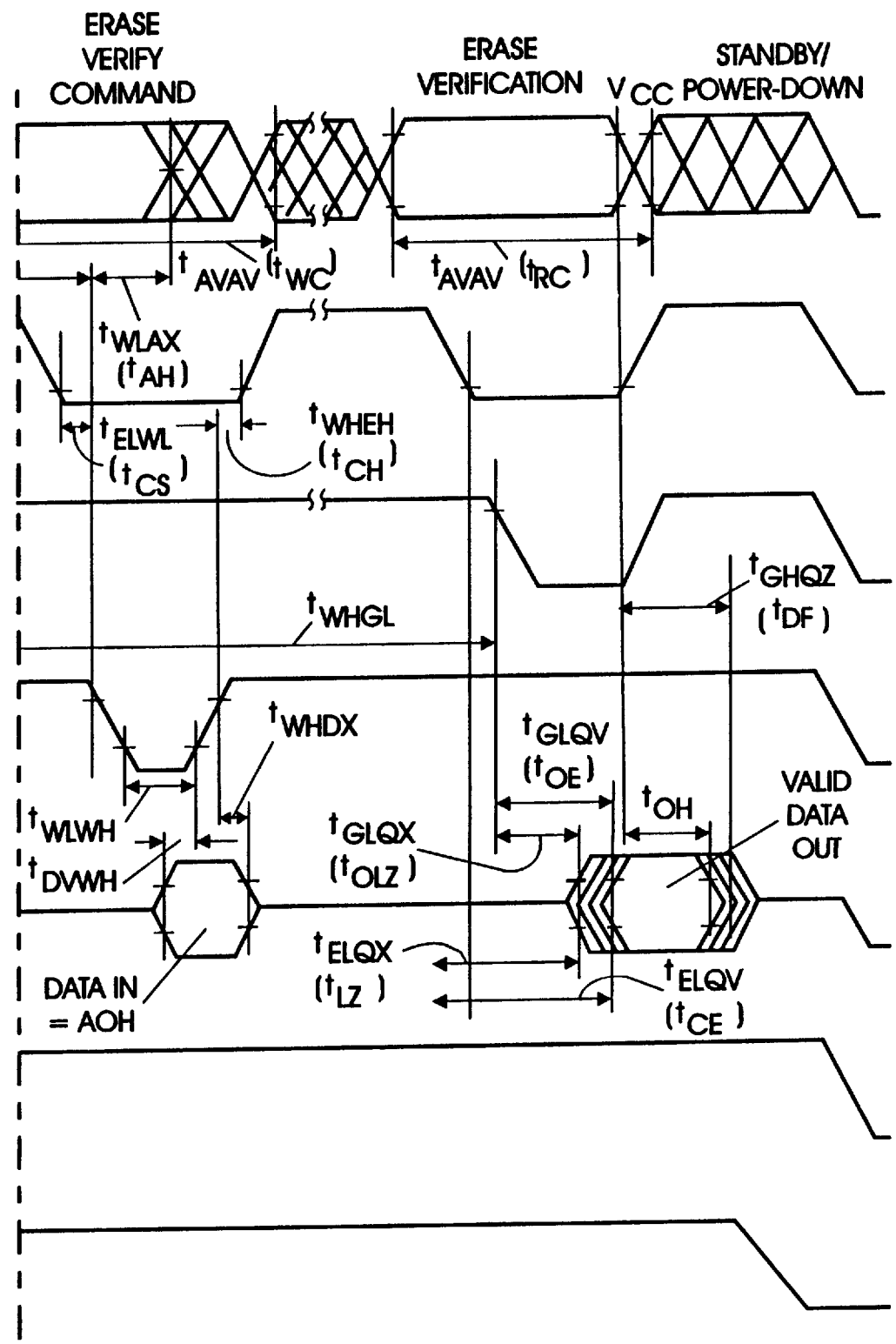

FIG. 11C1

FIG. 11C2
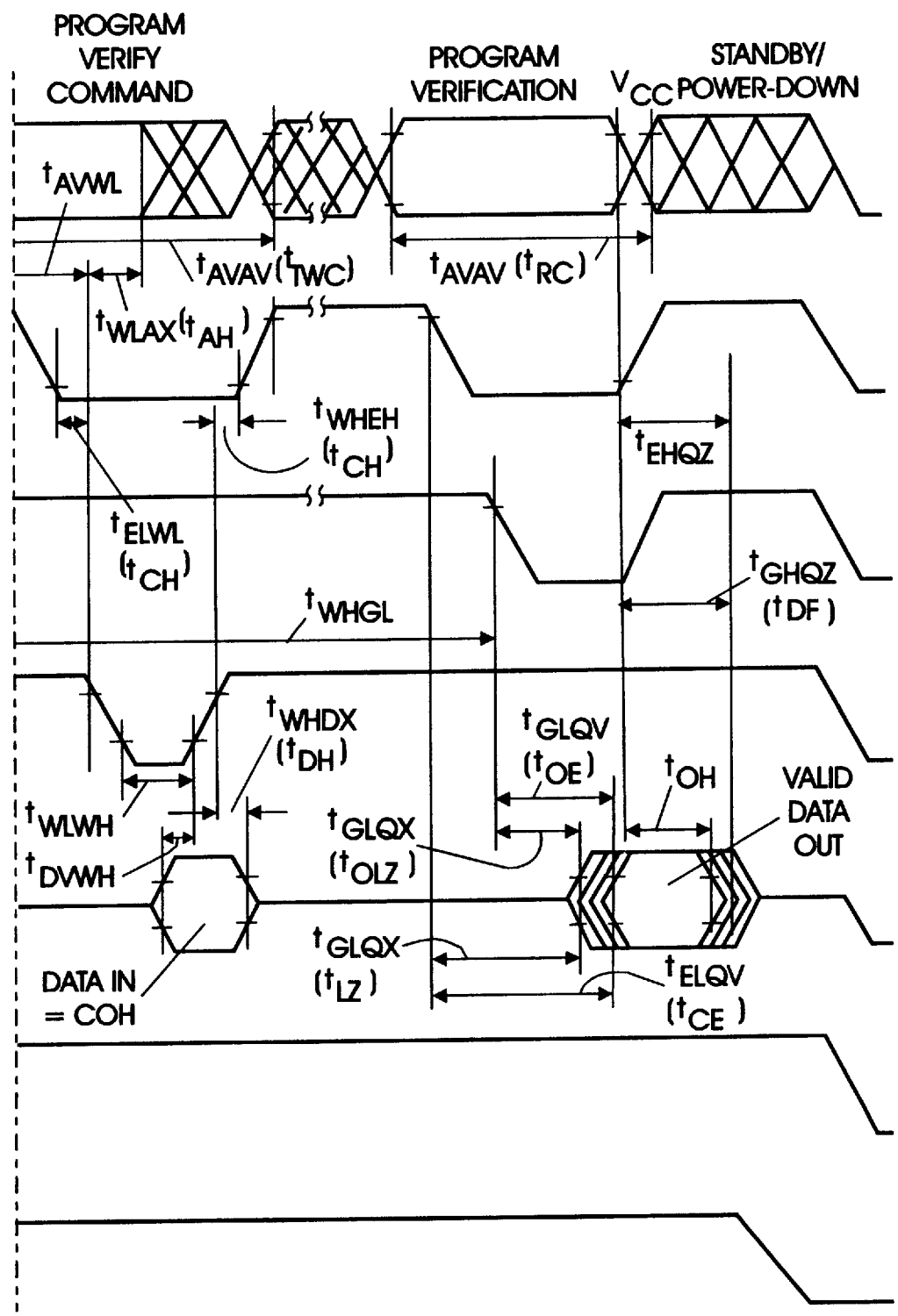

FIG. 12

| INPUTS | | | | | OUTPUTS | |
|---|---|---|---|---|---|---|
| PRESET | CLEAR | CLOCK | J | ~K | Q | ~Q |
| L | H | X | X | X | H | L |
| H | L | X | X | X | L | H |
| L | L | X | X | X | H | H |
| H | H | ↑ | L | L | Q0 | ~Q0 |
| H | H | ↑ | H | L | H | L |
| H | H | ↑ | L | H | L | H |
| H | H | ↑ | H | H | TOGGLE | |
| H | H | L | X | X | Q0 | ~Q0 |

AUTOMATED PROGRAMMABLE FIREWARE STORE FOR A PERSONAL COMPUTER SYSTEM

CROSS-REFERENCE TO RELATED APPLICATION

This application is a continuation-in-part of commonly owned application Ser. No. 07/777,844, filed Oct. 16, 1991, entitled PROGRAMMABLE FIRMWARE STORE FOR A PERSONAL COMPUTER SYSTEM, now pending.

FIELD OF THE INVENTION

This invention relates to personal computer systems and, more particularly, to an arrangement for storing system firmware.

BACKGROUND OF THE INVENTION

Personal computer systems in general, and IBM personal computers in particular, have attained widespread use for providing computer power to many segments of today's society. A personal computer system can usually be defined as a desk top, floor standing, or portable computer that includes a system unit having a system processor, a display monitor, a keyboard, one or more diskette drives, a fixed disk storage, an optional pointing device such as a "mouse," and an optional printer. These systems are designed primarily to give independent computing power to a single user or small group of users and are inexpensively priced for purchase by individuals or businesses. Examples of such personal computer systems are sold under the trademarks: IBM's PERSONAL COMPUTER, PERSONAL COMPUTER XT, PERSONAL COMPUTER AT and IBM's PERSONAL SYSTEM/2 (hereinafter referred to as the IBM PC, XT, AT, and PS/2, respectively) Models 25, 30, 50, 55, 57, 60, 65, 70, 80, 90 and 95.

These systems can be classified into two general families. The first family, usually referred to as Family 1 Models, uses a bus architecture exemplified by the IBM AT computer and other "IBM compatible" machines. The second family, referred to as Family 2 Models, uses IBM's MICRO CHANNEL bus architecture exemplified by IBM's PS/2 Models 50 through 95. The bus architectures used in Family 1 and Family 2 are well known in the art.

Beginning with the earliest personal computer system of the Family 1 models, the IBM PC, and through the Family 2 models the system processor was chosen from the Intel "86 Family" of processors (i.e., microprocessors). The Intel 86 Family of processors includes the 8088, 8086, 80286, 80386, and 80486 processors commercially available from Intel Corporation. The architecture of the Intel 86 Family of processors provides an upwardly compatible instruction set which assists in preserving software investments from previous processors in the 86 Family of processors. This upward compatibility preserves the software application base and is one of the major factors which contributed to the enormous success of the IBM PC and subsequent models.

The IBM PC and XT were the first models of the IBM personal computer line and used the Intel 8088 processor. The next significant change to IBM personal computer systems was the IBM AT which used the Intel 80286 processor. The PS/2 line spanned several of the Intel processors. A system similar to the PC and XT was a version of the PS/2 Model 30 which used an Intel 8086. The PS/2 Models 50 and 60 both used the Intel 80286 processor. The Intel 80386 processor is used in the IBM PS/2 Model 80 and certain versions of the IBM PS/2 Model 70. Other versions of the IBM PS/2 Model 70, as well as the PS/2 Models 90 XP 486 and 95 XP 486, use the Intel 80486 processor. One of the common points in all these systems is the use of an Intel 86 Family processor. A variety of commonly available and well known software operating systems, such as a DOS or an OS/2 operating system, can operate on various members of the Intel 86 Family of processors.

The processors in the Intel 86 Family support a variety of "modes." The basic mode in the Intel 86 Family of processors is a "Real" mode. Real mode is the only operating mode of the 8088 and 8086 processors. Real mode supports a one megabyte address space.

There are no protection mechanisms available in the 8088 and 8086 processors. The 80286 supports both a Real and a "Protected" mode of operation. As the name "Protected" implies, Protected mode provides a protected mode of operation. This protection prevents an application from interfering with the operation of other applications or the operating system. The 80286 provides extended addressing capabilities over the 8088 and 8086 by allowing up to sixteen megabytes of memory to be addressed directly. To maintain downward compatibility, the 80286 can be operated in Real mode to emulate the Real mode of the 8088 or 8086. The 80386 and 80486 extend the Intel 86 Family architecture even further by providing the ability to address up to four gigabytes of physical memory. The 80386 and 80486 also support a "Virtual 86" mode of operation. The Virtual 86 mode supports the operational characteristics of the Real mode within the overall confines of the Protected mode environment. This Virtual 86 mode is useful for providing a very high level of compatibility with applications which run under the DOS operating system but must now operate within an overall Protected mode operating system.

Beginning also with the earliest personal computer system of the Family 1 models, such as the IBM PC, it was recognized that a goal of achieving software-hardware compatibility would be of great importance. In order to achieve this goal, an insulation layer of system resident code, also referred to as "microcode," was established between the hardware and the software. This code provided an operational interface between a user's application program/operating system and the hardware device to relieve the user of the concern about the characteristics of hardware devices. Eventually, the code developed into a basic input/output system (BIOS), for allowing new hardware devices to be added to the system, while insulating the application program from the peculiarities of the hardware devices. The importance of BIOS was immediately evident because it freed a device driver from depending on specific hardware device characteristics while providing the device driver with an intermediate interface to the device. Because BIOS was an integral part of the computer system and controlled the movement of data in and out of the system processor, it was resident on a system planar board of the system unit and was shipped to the user in a read-only memory (ROM). For example, BIOS in the original IBM PC occupied 8K bytes (a kilobyte or "K byte" refers to a quantity of 1024 bytes) of ROM resident on the planar board. In addition to the ROM, the planar board included the system processor, a main random access memory (RAM), and other components which were fixed in a substantially coplanar relationship on the board. The ROM also contained a power-on self test (POST) program which was used to test and initialize the computer system. The accumulation of code resident in the computer system ROM became known as the "system firmware," or simply "firmware." Thus, the firmware included a POST portion and a BIOS portion. Sometimes, BIOS was defined to include the POST program.

As new models of the personal computer family were introduced, the firmware had to be updated and expanded to support new hardware devices such as input/output (I/O) devices. As could be expected, the firmware started to increase in memory size. For example, with the introduction of the IBM PERSONAL COMPUTER AT, the firmware grew to require 32K bytes of ROM. With the introduction of the IBM PERSONAL SYSTEM/2 computer system with MICRO CHANNEL architecture, a significantly new BIOS, known as Advanced BIOS, or ABIOS, was developed. However, to maintain software compatibility, BIOS from the Family 1 models had to be included in the Family 2 models. The Family 1 BIOS became known as Compatibility BIOS or CBIOS. Thus, BIOS evolved to include more than one type of BIOS such as the Compatibility Basic Input Output System (CBIOS) and the Advanced Basic Input Output System (ABIOS). Present architectural definitions for personal computer systems allow for up to 128K bytes of system firmware address space.

Today, with the continuing development of new technology, personal computer systems are becoming even more sophisticated and are being enhanced more frequently. Because the technology is changing rapidly and new I/O devices are being added to the personal computer systems, implementing modifications and effecting extensions to the firmware have become significant problems in the development cycle of personal computer systems. In addition, maintenance of the firmware in computer systems which are installed at user locations is also a problem.

Sometimes, personal computer systems are linked to form a network (e.g., a Local Area Network or LAN) so that users can exchange information, share I/O devices, and utilize a particular direct access storage device (DASD) such as a particular fixed disk storage. Typically, the LAN includes "Clients" and a "Server." A Client includes a computer system having usually no DASD other than possibly a diskette drive. A Server is a computer system which includes a DASD for supplying the storage for the Clients of the local area network. Clients may require modifications, updates, extensions or maintenance of the firmware.

As a result of these problems and requirements, and of a desire to modify the firmware as late as possible in the development cycle, it has become necessary to provide the ability to modify the firmware with a minimal disruption to the operation of the personal computer system. Because marketability and consumer acceptance of personal computer systems appear to require the ability to add new I/O devices and to minimize cost, it should be appreciated that an easy modification of the firmware is a substantial factor in achieving success in marketing personal computer systems. Personal computer systems have traditionally stored at least a part of the system firmware in ROM. See, for example, commonly owned U.S. patent application Ser No. 07/398,865, entitled "Initial BIOS Load for a Personal Computer System," which is hereby incorporated by reference. The major drawback of ROM is that once the ROM is manufactured its contents cannot be altered. For example, if the POST program code must be changed, the ROM must be physically changed. The ROM has traditionally been socketed to allow for the ROM to be replaced. However, changing the ROM in the field (i.e., at a customer location) is time consuming and, thus, costly.

It is known to replace the ROM with an electrically erasable and reprogrammable (i.e., alterable) nonvolatile random access memory (e.g., Flash memory), and to store POST and/or BIOS therein. See, for example, the publication from Intel Corporation, entitled *Memory Products* 1991, Intel Order No. 210830, ISBN 1-55512-117-9, and particularly Chapter 6 (*Flash Memories*, pgs. 6-1 through 6-420), which chapter is hereby incorporated by reference. This replacement permits the firmware to be modified easily.

However, the present inventors believe that there exists a need to ensure the integrity of system firmware efficiently while permitting the system firmware to be modified easily.

SUMMARY OF THE INVENTION

A principal object of the present invention is ensuring the integrity of system firmware efficiently while allowing the firmware to be modified easily.

A further object of the present invention is modifying the firmware in a personal computer system while ensuring that such system retains sufficient firmware to remain operable.

Yet another object of the present invention is to permit automatic selection among a plurality of firmware banks within a personal computer system.

The present invention has been developed for overcoming the above-mentioned needs, requirements and problems. In accordance with the invention, an apparatus for storing firmware includes: a plurality of nonvolatile alterable electronic memory devices being connected in an electrically mutually parallel circuit arrangement, and means for controlling the memory devices such that firmware can be read from or written to an automatically selected one of the memory devices, the controlling means being electrically connected to the memory devices. Each memory device can include the same or a different version of the firmware. The redundant memories of this invention permit ensuring firmware integrity by write protecting at least one of the memories. The present invention is an improvement of the invention disclosed in previously referenced and commonly-owned application ser. No. 777,844, filed Oct. 16, 1991, which is hereby incorporated by referenced.

BRIEF DESCRIPTION OF THE DRAWING

Further and still other objects of the present invention will become more readily apparent in light of the following description taken in conjunction with the accompanying drawing, in which:

FIG. 2, comprising FIGS. 2A–D, is a block schematic diagram of a unified planar board for the computer system of FIG. 1A;

FIG. 3, comprising FIGS. 3A–C, is a block schematic diagram of an alternative planar board for the computer system of FIG. 1A;

FIG. 4, comprising FIGS. 4A–B, is a block schematic diagram of a processor card for use with the alternative planar board of FIG. 3;

FIG. 5D is a table which shows the read and write modes of the apparatus of FIG. 5B as such modes relate to primary control input signals (BSP, ALTBANK, WAE);

FIGS. 6D1–2, is a more detailed block schematic diagram of the Timer (Counter) Logic of FIG. 6B;

FIG. 7 is a flow diagram of a power-on procedure as it applies to the firmware subsystem;

FIG. 10A1–2, and FIGS. 10B1–2, are flow diagrams for erasing and programming Intel 28F010 Flash memories.

FIGS. 11C1–2, are diagrams of signal waveforms, respectively, for reading, erasing and programming operations of one Intel 28F010 Flash memory, and FIG. 12 is a truth table for a J-K flip-flop device, specifically the Texas Instruments SN74ALS109A.

DETAILED DESCRIPTION OF THE PREFERRED EMBODIMENT

The following detailed description is of the best presently contemplated mode for carrying out the present invention. This description is not to be taken in a limiting sense, but is made for the purpose of illustrating the general principles of the invention.

Figure 1A:
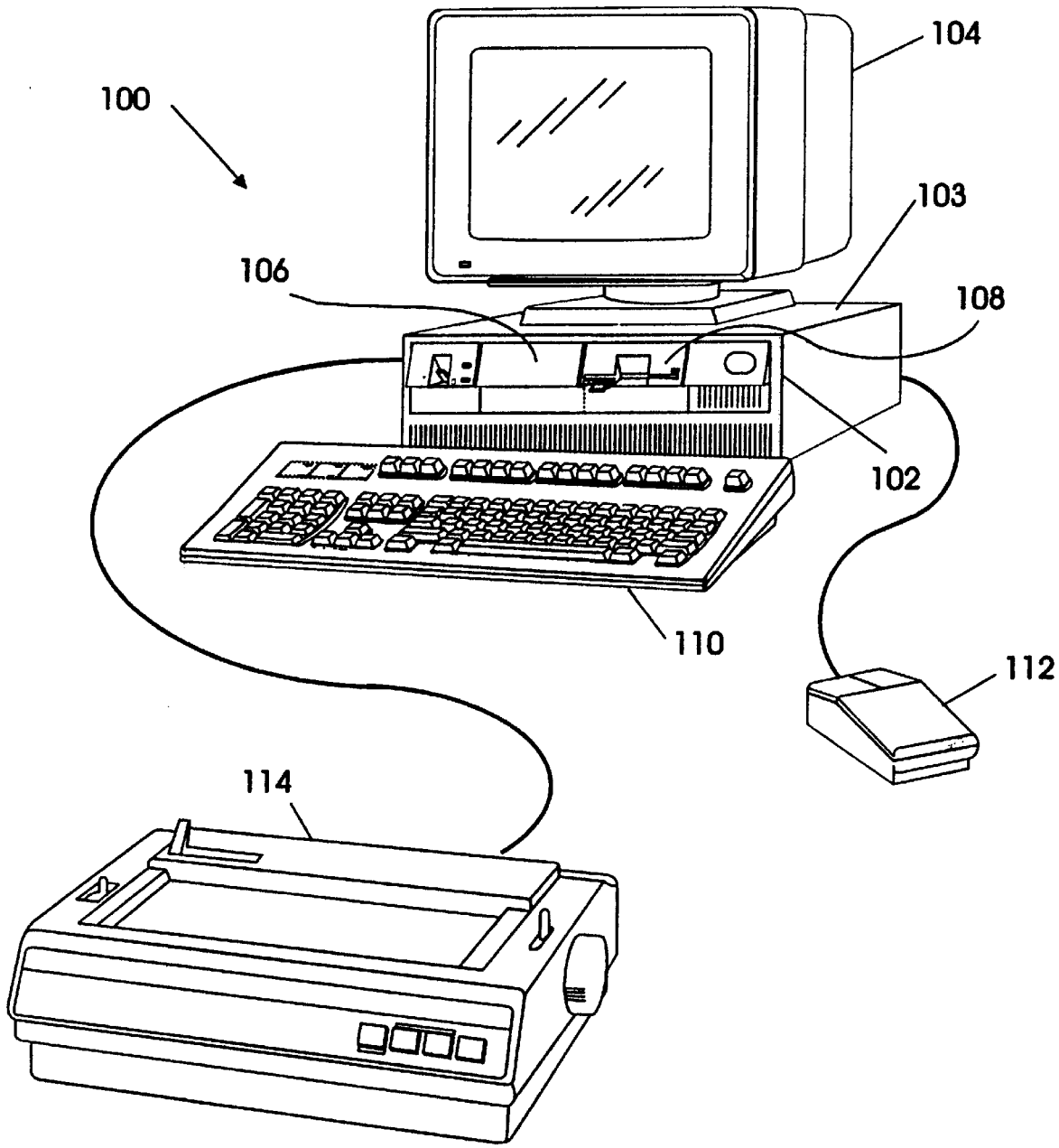
FIG. 1A is a drawing of a typical personal computer system.

Referring now to the figures, and in particular to FIG. 1A, there is shown a personal computer system 100 which employs the present invention. The personal computer system 100 comprises a system unit 102 having a suitable enclosure or casing 103, output device or monitor 104 (such as a conventional video display), input devices such as a keyboard 110, an optional mouse 112, and an optional output device such as a printer 114. Finally, the system unit 102 may include one or more mass storage devices such as a diskette drive 108 and a hard disk drive (hardfile) 106.

Figure 1B:
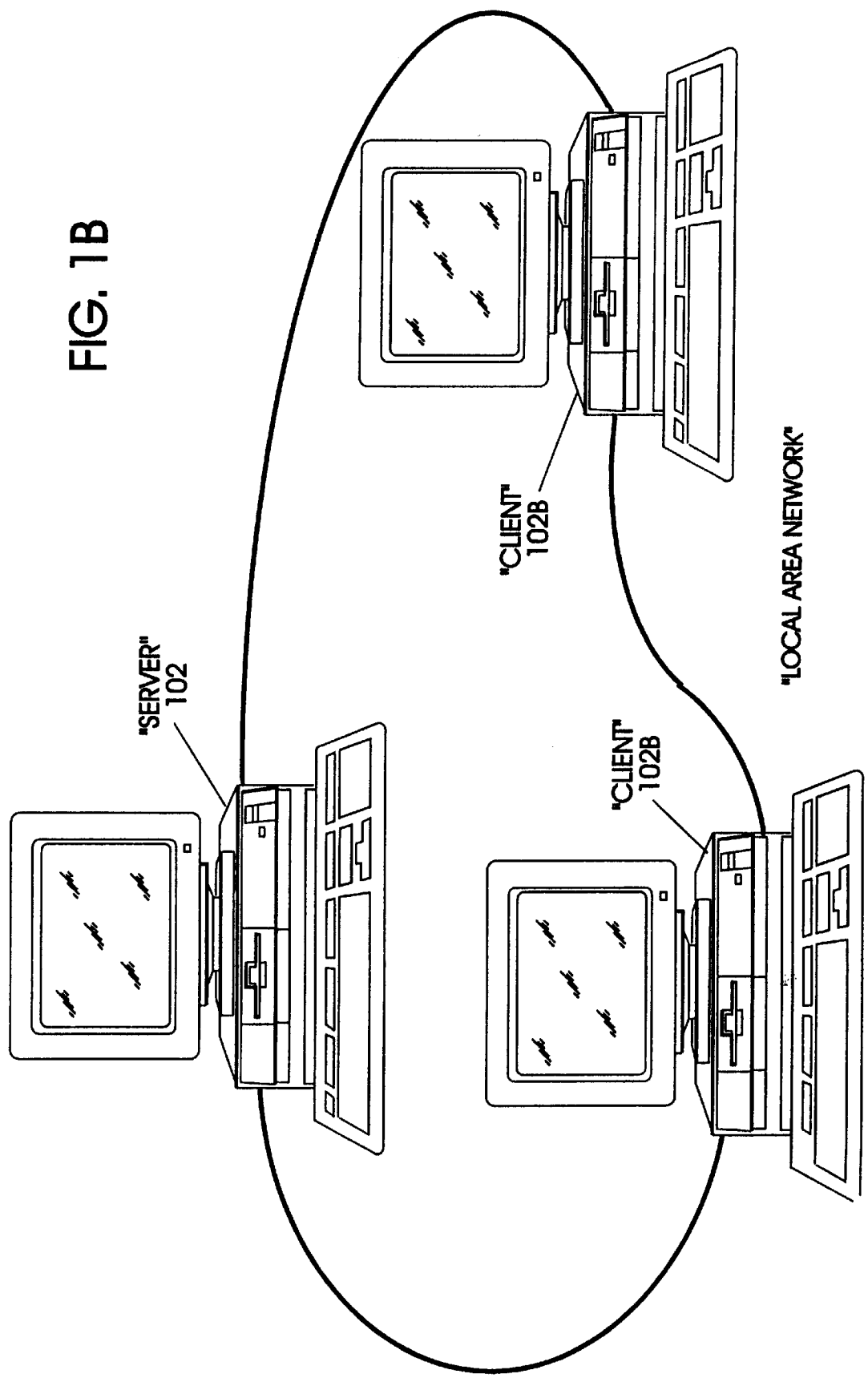
FIG. 1B is a diagram of a typical local area network.

The system unit 102 responds to the input devices. Optionally, the unit 102 and selected input and output devices 106, 108, 110, 104 may be connected in a well-known manner with other system units 102B to form a local area network (LAN) as shown in FIG. 1B. Typically, such units (Clients) 102B include no drives 106, 108. Of course, those skilled in the art are aware that other conventional I/O devices can also be connected to the system units 102, 102B for interaction therewith.

Figure 9:
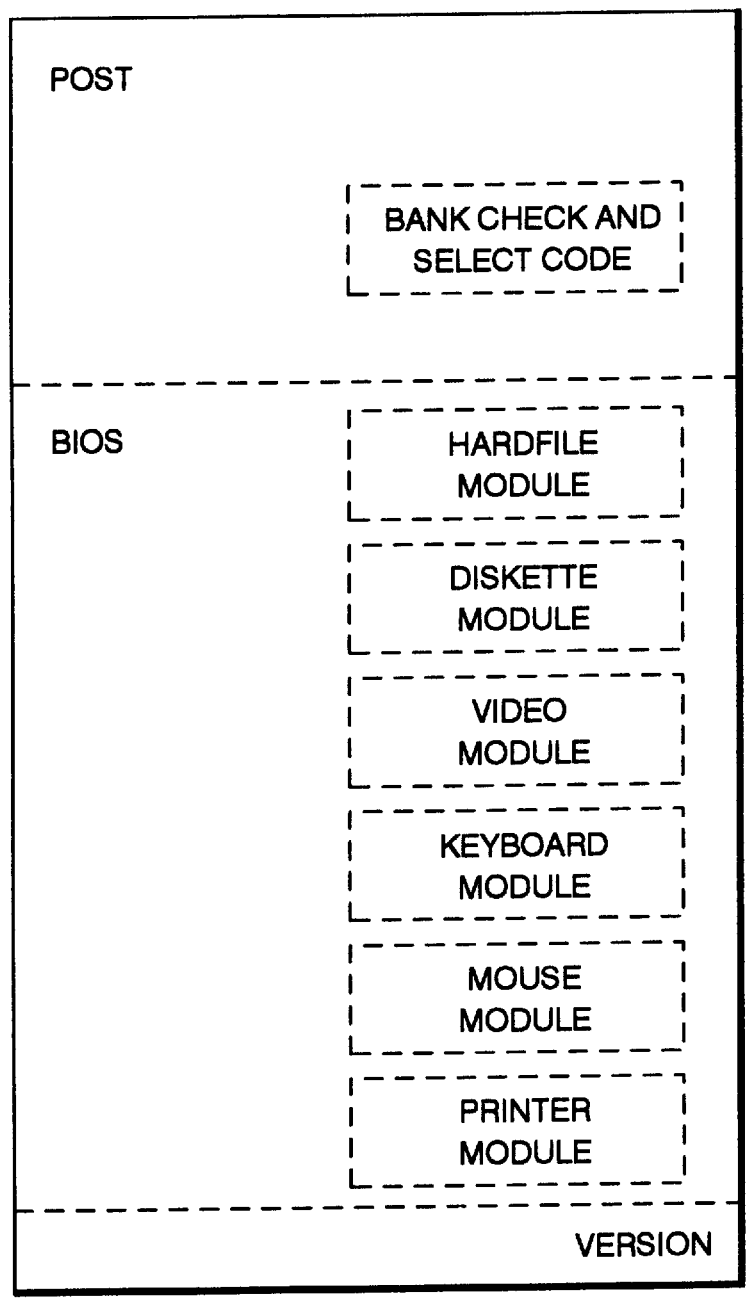
FIG. 9 is a memory map for typical firmware which is stored in a memory device of FIG. 5B.

In normal use, the personal computer system 100 is designed to give independent computing power to a small group of users as a server in a LAN or to a single user, and is inexpensively priced for purchase by individuals or small businesses. In operation, a processor 202 (FIGS. 2 and 4) functions under an operating system such as IBM's OS/2 operating system or a DOS operating system. The operating system is loaded into and stored within the system unit 102 in any conventional manner. The operating system typically utilizes a BIOS interface between the I/O devices and the operating system. BIOS, which is a part of the firmware, is divided into optional modules by function (see FIG. 9). BIOS provides an interface between the hardware devices and the operating system software to enable a programmer or user to program his machine without an in-depth operating knowledge of a particular hardware device. For example, a BIOS diskette module permits a programmer to program the diskette drive without an in-depth knowledge of the diskette drive hardware. Thus, a number of diskette drives designed and manufactured by different companies can be used within the system 100. This not only lowers the cost of the system, but also permits a user to choose from a number of diskette drives. BIOS is more clearly defined in the *IBM Personal System/2 and Personal Computer BIOS Interface Technical Reference* 1988, which is hereby incorporated by reference herein.

Unified Planar

Figure 2B:
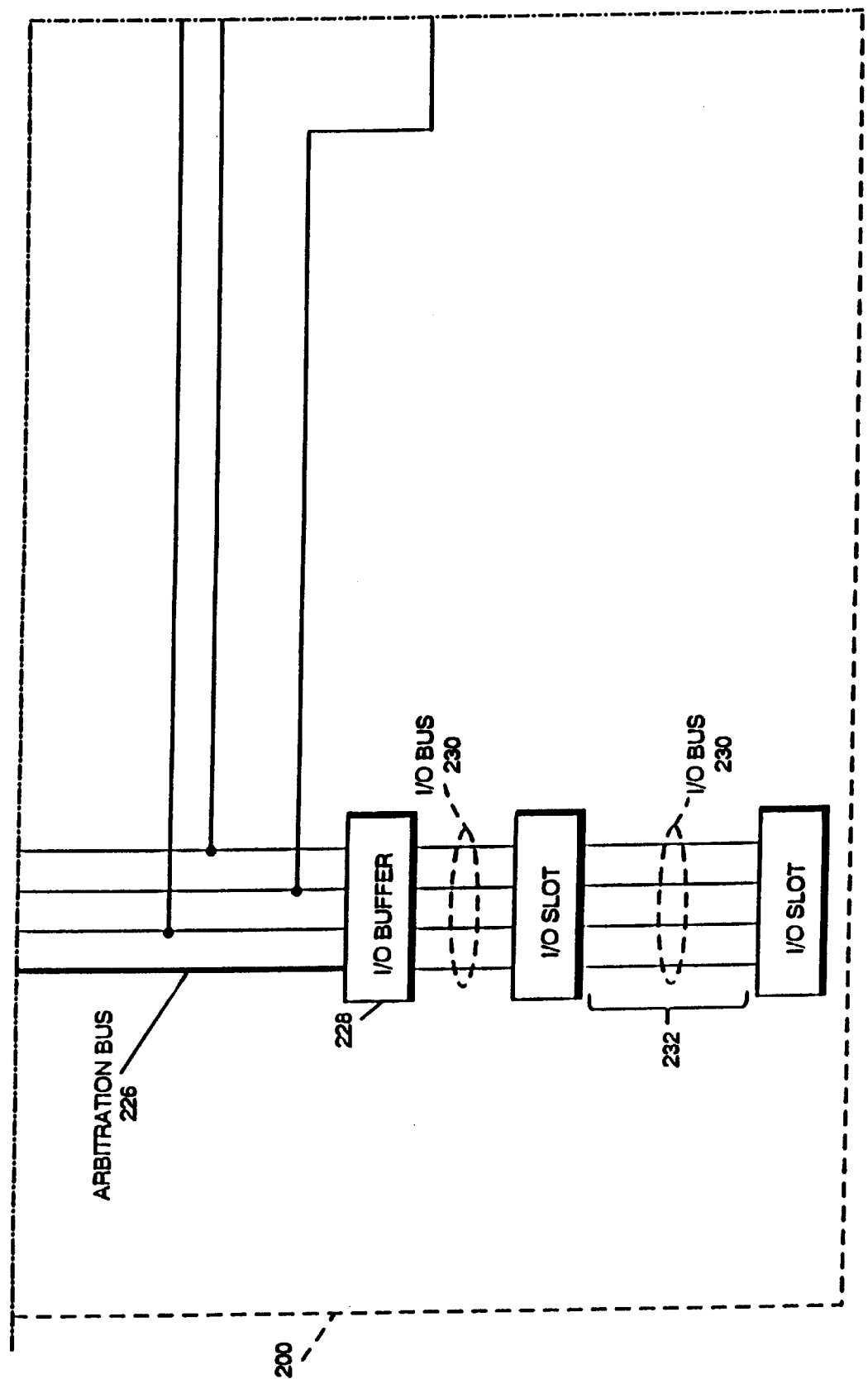

Referring to FIG. 2, there is shown a block diagram of a unified planar 200 of the system unit 102. The planar 200 includes a printed circuit board (PCB) 201 upon which are mounted or connected a number of input/output bus connectors 232 having I/O slots, a processor 202 which is connected by a high speed CPU local bus 210 under control of a bus control unit 214 to a memory control unit 256. The unit 256 is further connected to a main memory such as volatile random access memory (RAM) 264. Any appropriate processor 202 can be used such as an Intel 80386, Intel 80486 or the like. A system power connector 205 is mounted on the PCB 201 for connection to a power unit (not shown) that supplies the necessary power for the system 100.

The CPU local bus 210 (comprising address, data and control components) provides for the interconnection of the processor 202, an optional math coprocessor 204, an optional cache controller 206, and an optional cache memory 208. Also coupled onto the CPU local bus 210 is a system buffer 212. The system buffer 212 is itself connected to a slower speed (compared to the CPU local bus 210) system bus 216 which comprises address, data and control components. The system bus 216 extends between the system buffer 212 and an I/O buffer 228. The system bus 216 is further connected to the bus control unit 214 and to a direct memory access (DMA) control unit 220. The DMA control unit 220 includes a central arbiter 224 and a DMA controller 222. The I/O buffer 228 provides an interface between the system bus 216 and an I/O bus 230. An oscillator 207 is connected as shown for providing suitable clock signals to the firmware subsystem 242. Those skilled in the art will recognize that while the preferred embodiment is implemented on the MICRO CHANNEL bus of an IBM PS/2 computer system, which is well known in the art, alternative bus architectures could also be used to employ the invention.

Connected to the I/O bus 230 is a plurality of I/O bus connectors having slots 232 for receiving adapter cards (not shown) which may be further connected to I/O devices or memory (e.g., hardfile 106). Two I/O connectors 232 are shown for convenience, but additional I/O connectors may easily be added to suit the needs of a particular system. An arbitration bus 226 couples the DMA controller 222 and the central arbiter 224 to the I/O connectors 232 and a diskette adapter 246. Also connected to the system bus 216 is a memory control unit 256 which includes a memory controller 258, an address multiplexer 260, and a data buffer 262. The memory control unit 256 is further connected to a main memory such as a random access memory as represented by the RAM module 264. The memory controller 258 includes logic for mapping addresses to and from the processor 202 to and from particular areas of the RAM 264. While the system 100 is shown with a basic one megabyte RAM module 264, it is understood that additional memory can be interconnected as represented in FIG. 2 by the optional memory modules 266, 268, 270.

A buffer 218 is coupled between the system bus 216 and a planar I/O bus 234. The planar I/O bus 234 includes address, data, and control components. Coupled along the planar I/O bus 234 are a variety of I/O adapters and other peripheral components such as a display adapter 236 (which is used to drive the optional display 104), a clock 250, a nonvolatile RAM 248 (hereinafter referred to as NVRAM), a serial adapter 240 (other common terms used for "serial" are "asynchronous" and "RS232"), a parallel adapter 238, a plurality of timers 252, the diskette adapter 246, a keyboard/mouse controller 244, an interrupt controller 254, and a firmware subsystem 242 which is essential to the present invention. According to the present invention, the subsystem 242 includes a plurality (e.g., two) of nonvolatile alterable electronic memory devices which are connected in an electrically mutually parallel circuit arrangement. Each memory device includes the POST and the BIOS programs. POST includes a Bank Check and Select program portion of the invention. The firmware subsystem 242 and the remaining essential elements of the invention will be described later with respect to FIGS. 5A, 5B, 5C, 5D, 6A, 6B, 6C, 6D, 6E, 6F, 7, 8, 9, 10A, 10B, 10C, 11A, 11B, 11C and 12.

The clock 250 is used for time of day calculations. The NVRAM 248 is used to store system configuration data. That is, the NVRAM 248 will contain values which describe the present configuration of the system 100. The NVRAM 248 contains information which describes, for example, adapter card initialization data, capacity of a fixed disk or a diskette, the amount of memory, etc. Furthermore, these data are stored in NVRAM 248 whenever a configuration program is executed. This configuration program can be a conventional Set Configuration program provided on a system Reference Diskette included with IBM PS/2 computer systems. The Reference Diskette is sometimes referred to as a diagnostic, maintenance or a service diskette. The purpose of the configuration program is to store values characterizing the configuration of this system 100 to NVRAM 248 which are saved when power is removed from the system. The NVRAM can be a low power CMOS memory with a battery backup.

Connected to the keyboard/mouse controller 244 are a port A 278 and a port B 280. These ports are used to connect the keyboard 110 and the mouse 112 to the personal computer system 100. Coupled to the serial adapter unit 240 is a serial connector 276. An optional device such as a modem (not shown) can be coupled to the system through this connector 276. Coupled to the parallel adapter 238 is a parallel connector 274 to which a device such as the printer 114 can be connected. Connected to the diskette adapter 246 is a diskette connector 282 used to attach one or more diskette drives 108.

Planar Board

Figure 3C:
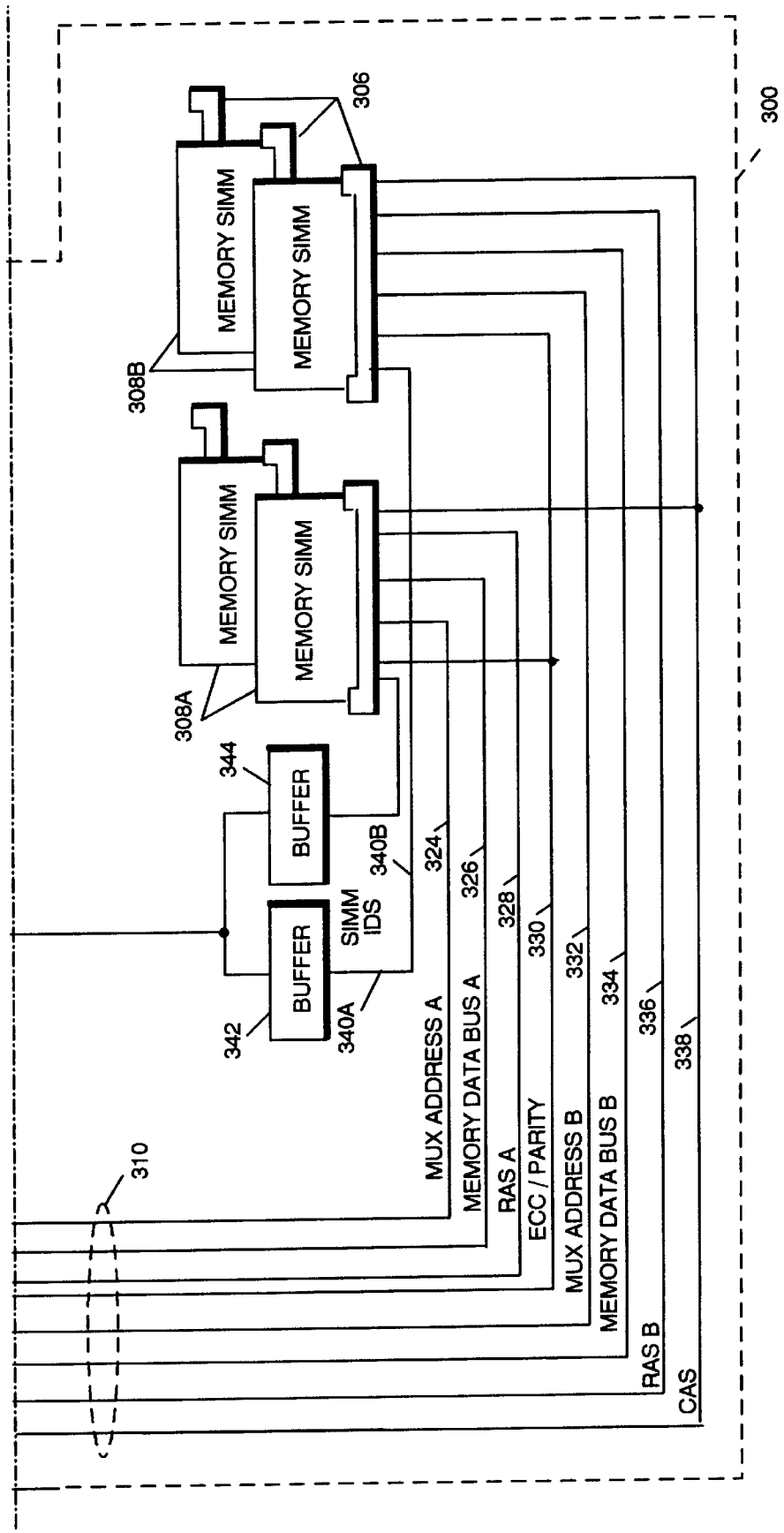
Figure 4B:
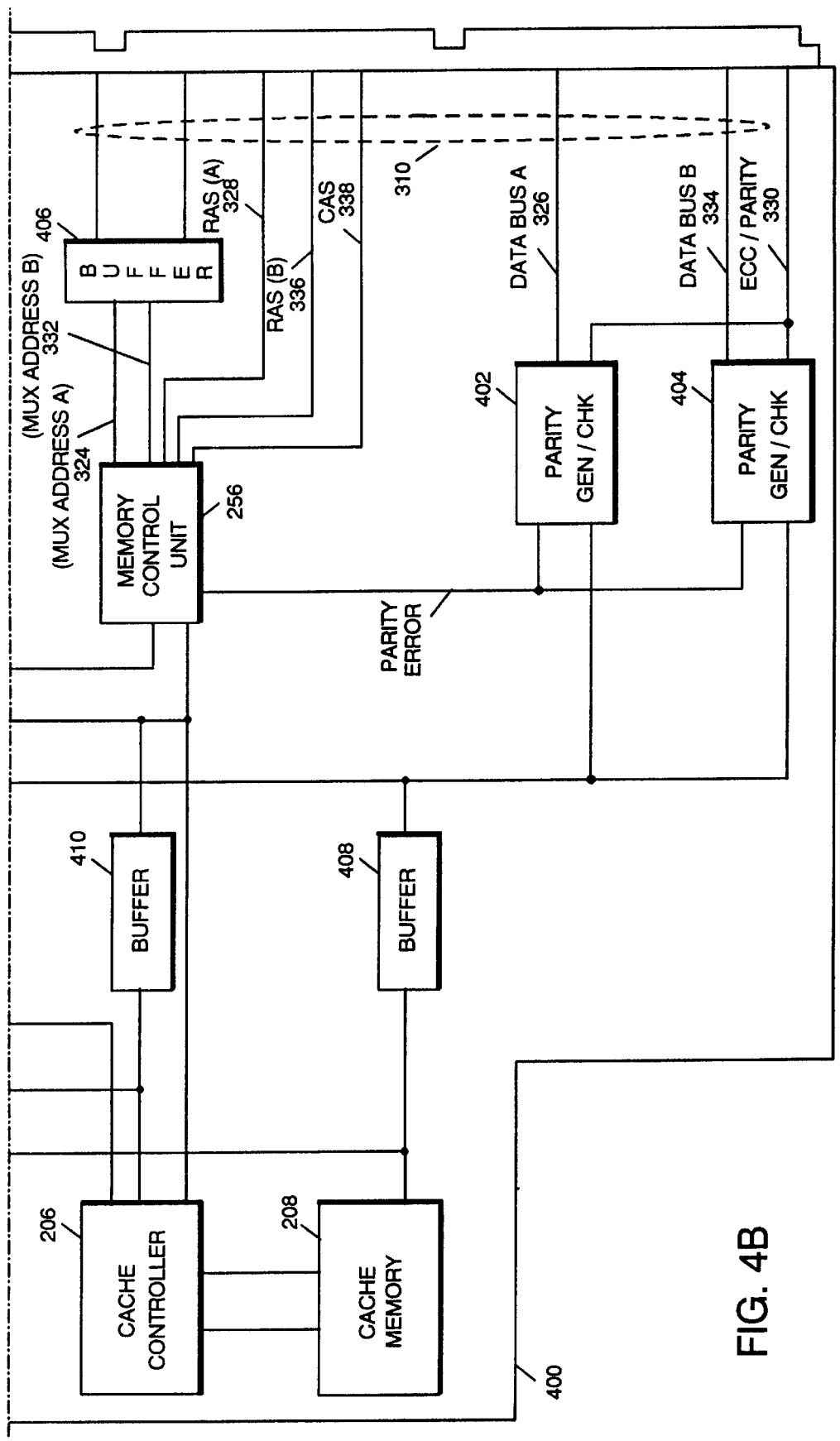

According to an alternative embodiment of the personal computer system 100, the unified planar 200 is replaced by a planar board 300 and a processor card 400 (FIGS. 3 and 4). The processor card 400 is removably mounted on and is electrically connected to the planar board 300. Identical element numbers of FIG. 2 correspond to identical elements in FIGS. 3 and 4. Referring now to FIG. 3, the planar board 300 comprises a printed circuit board (PCB) 301 upon which are mounted (e.g., surface mounted) various components that are interconnected by wiring or circuits in the PCB. Such components include a suitable commercially available electrical connector 302 into which an edge 416 of the processor card 400 is plugged for removably mounting and electrically connecting the processor card 400 to the planar board 300. A plurality of single in-line memory module (SIMM) connectors 306 is also mounted on the PCB 301 for connecting to the memory banks 308A, 308B forming the system main memory or RAM. One or more I/O bus or expansion connectors 232 are also mounted on the PCB 301 for connection to different expansion adapters and options that might be added or incorporated into the personal computer system 100. For example, the fixed disk drive 106 may be connected to an adapter card (not shown) having a disk controller which is connected to a connector 232. Preferably, each connector 232 is a commercially available connector of the type conforming to the above-mentioned MICRO CHANNEL architecture.

Also mounted on the planar board 300 are an interrupt controller 254 and a keyboard and mouse controller 244 which are connected to keyboard and mouse connectors 278, 280, a diskette controller 246 connected to a diskette connector 282, and serial and parallel adapters 240, 238 connected to serial and parallel connectors 276, 274 which allow the various I/O devices to be connected into the system. A system power connector 205 is mounted on the PCB 301 for connection to a power unit (not shown) that supplies the necessary power for the system. A nonvolatile memory (NVRAM) 248 and a time-of-day clock 250 are also mounted on the PCB 301. The PCB 301 also has mounted thereon various oscillators (not shown) to provide timing signals, and buffers 342, 344 (not all shown) to isolate sections of the circuitry in a manner well known.

The wiring of PCB 301 interconnects the various components as shown in the drawing and is grouped into three groupings, a memory bus 310 (including lines 324–338), a channel bus 312 (including address bus 322, data bus 320 and control bus 318), and miscellaneous signal lines including interrupt lines 314, 316, all of which are connected to counterpart wiring on the PCB 401 through the connectors 302, 416. Tapped off the bus 312 is a planar function bus 319.

Processor Card

Referring to FIG. 4, there is shown the processor card 400 for removably mounting on the planar board 300. The processor card 400 comprises a printed circuit board (PCB) 401 having mounted (e.g., surface mounted) thereon a plurality of commercially available components including a processor 202, an optional math coprocessor 204, an optional cache controller 206, an optional cache memory 208, a direct memory access (DMA) control unit 220, a bus control unit 214, a memory control unit 256, a firmware subsystem 242 of the present invention, and parity checking units 402, 404. The processor 202 preferably is a high performance type, such as an Intel 80486, having thirty-two bit data paths and providing thirty-two bit addressing capability. Of course, Intel 80386 and the like processors can be used. The remaining components are selected in conventional fashion for their compatibility with such processor. A plurality of buffers 406, 408, 410, 412, 414 is connected as shown. The buffers provide selective isolation or connection between the circuits allowing different portions to be used concurrently, for example, to move data between the processor 202 and cache memory 208 while other data is being transferred between an I/O unit and the main memory 308A, 308B. All of the above components are electrically connected to each other as appropriate by printed wiring circuits in PCB 401 which terminate at the edge connector 416. The edge connector 416 is pluggable into the edge connector 302 on the planar board 300 shown in FIG. 3 so that the planar board 300 and the processor card 400 are electrically and mechanically interconnectable.

The wiring circuits of the PCB 401 include a local bus 418 including data, address and control lines 420, 422, 424, respectively, which interconnect the processor 202 with an optional math coprocessor 204, an optional cache controller 206 and an optional cache memory 208, as shown in FIG. 4. The remaining circuit lines generally include interrupt lines 316, channel bus lines 312 and memory bus lines 310. The channel bus lines 312 include control, data and address bus lines 318, 320, 322, respectively. Memory bus lines 310 include multiplexed memory address lines 324, 332, row address strobe (RAS) lines 328, 336 for memory banks 308A, 308B, column address strobe (CAS) line 338, data bus A and B lines 326 and 334, and a line 330 for use in error checking via parity check or ECC checking. An oscillator 207 is connected as shown for providing suitable clock signals to the firmware subsystem 242. For simplicity, certain miscellaneous lines, such as reset, grounds, power-on, etc. have been omitted from FIGS. 2, 3 and 4.

During normal operation of a personal computer system 100 having a board 300 and a card 400, the card 400 is electrically and mechanically connected to the board 300 and typically lies in a plane oriented substantially perpendicularly to the board 400.

Firmware Subsystem

The system firmware includes the Power-On Self Test program (POST) and the Basic Input Output System program (BIOS). POST is the set of instructions which execute when the system is first powered-on. The execution of POST is critical to the initialization of the personal computer system 100. Without POST, the system would be unable to load an operating system or other programs (e.g., an update utility program). BIOS is the set of instructions which facilitates the transfer of data and control instructions between the processor 202 and I/O devices.

Figure 5A:
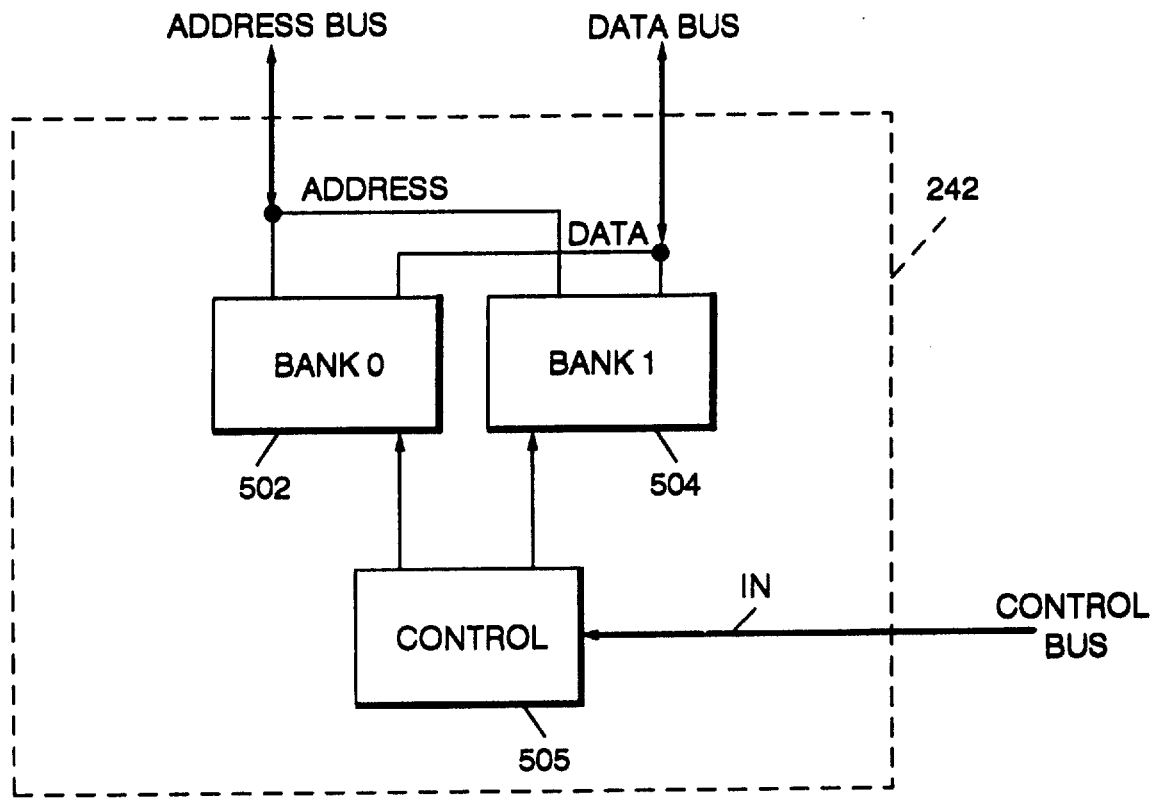
FIG. 5A is a block schematic diagram of the firmware subsystem according to the present invention.

Referring now to FIG. 5A, there is shown a block diagram of the firmware subsystem 242 according to the present invention. Two memory banks 502, 504 are shown managed by a control apparatus 505 which controls the reading and writing of the firmware from and into the memory banks 502, 504. The firmware subsystem 242 is connected to the appropriate address, data and control lines as shown in FIG. 2 or FIG. 4. The banks 502, 504 are connected in an electrically mutually parallel circuit arrangement, and are also connected to the control apparatus 505, all as shown in FIG. 5A. The control apparatus always write protects a selected one of the banks 502, 504. Preferably, complete firmware (i.e., POST and BIOS necessary for operation of the computer system) is stored within each of the banks 502, 504. POST includes a portion of code according to the invention. Such code portion is/performs a Bank Check and Select routine as shown in FIG. 7, steps 702–728. Bank Update code, which is part of a firmware update utility program (FIG. 8), is resident initially, e.g., on a diskette (not shown). The diskette is received within the diskette drive 108 so that the Bank Update code can be suitably loaded into the unit 102. Furthermore, when the unit 102 is connected as a server within a LAN as shown in FIG. 1B, the clients can suitably load the Update code from the server 102. Such Update code causes the reprogramming of a selected memory bank 502, 504 with updated firmware. The control apparatus 505, thus, operates responsive to signals originated at least by the Bank Check and Select code and/or the Bank Update code.

Figure 5C:
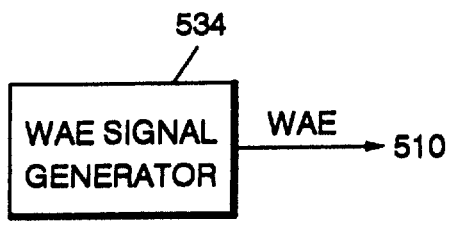
FIG. 5C is a block diagram of a generator for generating a Write Authority Enable (WAE) signal.
Figure 5B:
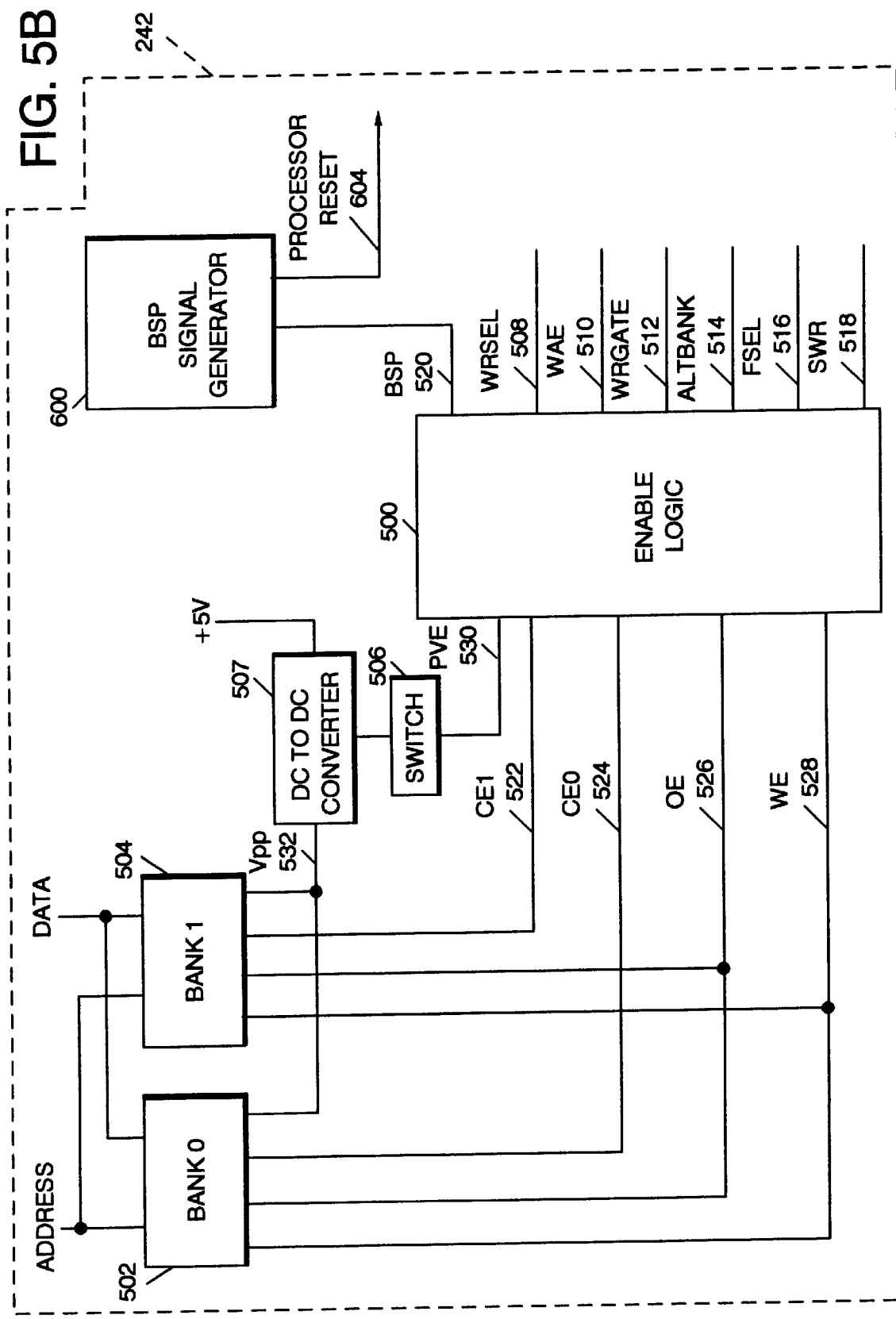
FIG. 5B is a block schematic diagram of a preferred embodiment of the invention shown in FIG. 5A.

FIG. 5B shows the firmware subsystem 242 in more detail. The subsystem 242 includes a plurality (e.g., two) of in-circuit reprogrammable (i.e., alterable) nonvolatile memory devices, bank 0 502 and bank 1 504. The memory devices or banks 502, 504 are of the semiconductor type such as the Intel 28F010 Flash Memory device described in *Intel Memory Products* 1991, pages 6-55 through 6-80 which is incorporated herein by reference. The Intel 28F010 Flash Memory provides 128 kilobytes of data storage capacity. The apparatus 505 of FIG. 5A includes an enable logic device 500 having input lines 508–520 for the signals WRSEL, WAE, WRGATE, ALTBANK, FSEL, SWR, BSP and output lines 522–530 for the signals CE1, CE0, OE, WE, PVE, voltage generator 507, 506 and various generators of the input signals (WRSEL, WAE, WRGATE, ALTBANK, FSEL, SWR, BSP) on the input lines 508–520. The input signals originate in the Bank Check and Select code, the Bank Update code, a BSP signal generator 600 and/or in various hardware, all as is well understood by those skilled in view of the instant specification. The device 500 is, for example, a logic device "PAL16R8D" commercially manufactured by Advanced Micro Devices, Inc. (AMD). Either the bank 0 502 or the bank 1 504 may be active at any given time. The enable logic of the device 500 determines which bank is to be active (active bank). A switch 506 controls a DC to DC converter 507 (converting +5 V to +12 V) which provides a programming voltage Vpp on a line 532 to the banks 502, 504. The switch 506 is, for example, a transistor device "2N3904" commercially manufactured by Motorola, Inc. The DC to DC converter 507 is, for example, a device "NMF0512S" commercially manufactured by International Power Sources, Inc. The memory banks 502, 504 are connected to the address and the data lines and the input lines 508–518 are connected to the control lines in a manner well within the skill of the art (see FIG. 2 or FIG. 4). The parallel banks 502, 504 can be permanently affixed to the PCB 201, 401 board because they can be reprogrammed in-place, unlike a ROM of previous computer systems which was socketed. The output lines 520, 604 of the generator 600 will be discussed hereinafter with respect to FIG. 6A.

It should be noted that a subsystem which employed only a single memory bank of Intel 28F010 Flash Memory would be vulnerable to incapacitation. Because of its construction, a Flash memory device must first be completely erased before it can be reprogrammed. If there is a power loss to a computer system during the time period in which a Flash memory is being erased or before it can be completely reprogrammed, then the critical initialization program (POST) is likely to be lost. Without POST, the system could not "boot" and, thus, could not load and run an update program which would update the firmware in the single memory bank.

Continuing to refer to FIG. 5B, a more detailed description of the enable logic device 500 is hereinafter presented. The enable logic device 500 has as an input a Write Select bit or signal (WRSEL) which is a bit obtained from an I/O control port and is used to enable writes to the selected bank 502 or 504. The control port used to provide the WRSEL signal is, for example, a standard I/O port resident in the Memory Control Unit 256 of FIG. 2 or FIG. 4. A control port is accessed through an "OUT" instruction of the Intel 86 Family of processors which is well known in the art. When WRSEL on the line 508 is a logical zero, writes are enabled. This WRSEL bit is under direct program control. Direct program control is understood to be a control by program code such as the Bank Update code, steps 800–810, of the update utility program (see FIG. 8) and the Bank Check and Select code, steps 702–728.

The Write Authority Enable (WAE) bit (signal) on the line 510 is a security feature which allows bank reprogramming to be prevented. For example, the control apparatus 505 may include a signal generator 534 (FIG. 5C). The generator 534 consists of, e.g., a three position key switch and a source of suitable potential (both not shown). One position of this switch is the OFF or disabled position. The second position of the switch is ON, but no maintenance authority. The third position is ON with maintenance authority. Maintenance authority can be considered to be equivalent to a "service mode" of operation. That is, a mode in which only a qualified computer service technician is allowed to perform certain tasks. The signal WAE would only be enabled (e.g., logical 0) by the switch when the switch is in the ON with maintenance authority position. This would ensure that the casual user could not alter the contents of the firmware banks 502, 504. Of course, the WAE bit on the line 510 could be controlled in a number of ways and the switch is only one such example. The WAE signal could be controlled by other logic in the computer system which could include a programmable I/O port. In systems which do not wish to support this added level of security, this WAE signal is always in the enabled state.

Continuing now with discussion of the enable logic device 500, the Write Gate (WRGATE) bit on the line 512 is a hardware generated timing signal (active low) received from the Memory Control Unit 256 of FIG. 2 or FIG. 4. WRGATE controls the pulse width of the Write Enable 528 (WE) signal on the line 528 to the firmware banks 502, 504 as set forth in the Intel 28F010 Flash device specification previously incorporated by reference and as shown in FIGS. 11B, 11C. The Alternate-Bank bit (ALTBANK) on the line 514 selects the Alternate-Bank for reads or writes (logical 0=Alternate-Bank). The Alternate-Bank is the bank which is not selected by a BSP signal on the line 520. The ALTBANK signal on the line 514 is received from the Memory Control Unit 256 of FIG. 2 or FIG. 4 and is under direct program control. The Bank Select and Protect (BSP) signal on the line 520, described in more detail with reference to FIG. 6, determines which bank is to be the "base", cold-start or default bank (logical 0=bank 0 502). The Firmware Select (FSEL) signal on the line 516 is active when any firmware address has been decoded during read or write cycles. FSEL 516 is received from hardware such as the Memory Control Unit 256 of FIG. 2 or FIG. 4 and is active low. System Write/Read 518 (SWR) signal on the line 518, a hardware generated timing signal, is high for a system write cycle, low for a read cycle. SWR 518 is received from hardware such as the Memory Control Unit 256 of FIG. 2 or FIG. 4. The signals WRGATE 512, FSEL 516, and SWR 518 are hardware generated timing and control signals which are well understood in the art in view of the instant specification.

A Programming Voltage Enable (PVE) output signal on the output line 530 of the enable logic device 500 controls the operation of the switch 506. When PVE 530 enables the switch 506, the DC to DC converter 507 is enabled and provides a +12 V programming voltage Vpp on the line 532 to the banks 502, 504. The converter 507 is connected to a source of potential (+5 V) readily available within the unit 102. When PVE 530 disables the switch 506, successful writes to the banks 502, 504 cannot occur. The Intel 28F010 Flash memory device requires +12 V to enable the reprogrammable or alterable feature of the device.

Figure 10C:
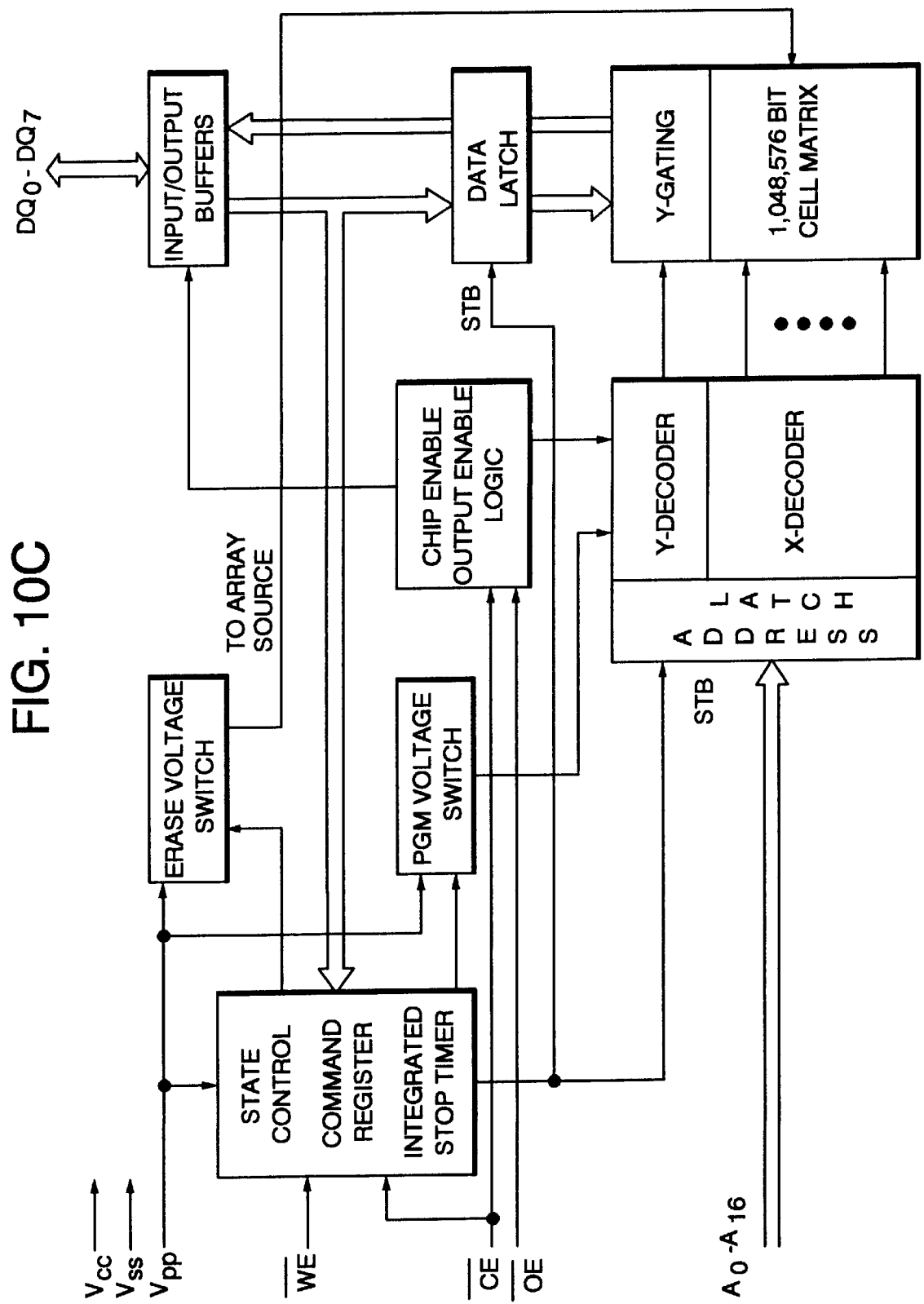
FIG. 10C is a block diagram of one Intel 28F010 Flash memory.

The Chip Enable signals (CE1, CE0), the Output Enable signal (OE), and the Write Enable signal (WE) are input signals to the Intel 28F010 Flash memory devices 502, 504. Chip Enable 0 524 (CE0) signal and Chip Enable 1 522 (CE1) signal determine which one of the banks 502, 504 is active. The respective Chip Enable signal activates the respective device's control logic, input buffers, decoders and sense amplifiers which are included within the elements of a respective Flash device as shown in FIG. 10C. Output Enable (OE) on the line 526 is an input signal common to both the bank 0 502 and the bank 1 504 which enables the reading of the active bank. Output Enable (OE) activates the device's data output signals during a read cycle. Write Enable (WE) on the line 528 is an input signal common to both the bank 0 502 and the bank 1 504 which determines if and when a data write will be accepted. Write Enable controls writes to the control register and the array of the active bank. Both of these signals (OE and WE) are gated internal to the Flash memories by the CE0 and CE1 signals. Thus, reads and writes can occur with respect to only the active bank.

The enable logic device 500 is defined by a set of equations hereinafter set forth for use in the programmable logic device 500 or other physical implementation (not shown). In the notation which follows, the underscore "_" is purely notational for the reader and means that the signal is active low. The notation used on the right-hand side of the equation is: the "!" means logical NOT, the "&" means logical AND, the "#" means logical OR. The "!" when used on the left-hand side of the equation is used to mean active low. That is, when the right-hand side evaluates to be active, the signal on the left-hand side is to be active in the low state. The five equations for these signals are:

!PVE_=!WRSEL_&!WAE

!CE0_=!FSEL_&!BSP_&ALTBANK_#!FSEL_&BSP_&!ALTBANK_

!CE1_=!FSEL_&CE0_

!OE_=!FSEL_&!SWR_

!WE_=!FSEL_&SWR_&!ALTBANK_&!WRSEL_&

!WAE &!WRGATE_

Although the above five equations completely describe the operation of the device 500, several example calculations may be instructive:

Example #1, a read operation directed to the default (base) power-on bank (bank 0) (reference FIG. 5D, ROW 1):
 With:
  SWR=0, WRSEL=1, WAE=0, FSEL=1, BSP=0, ALTBANK=1, WRGATE=1
 Then:
  PVE=1, CE0=1, CE1=1, OE=1, WE=1
 Then:
  FSEL=0 to start the read operation.
  Since SWR=0, a read will occur.

Then:
    PVE=1, CE1=1, WE=1, CE0=0, OE=0
    Data will then become valid until FSEL goes to 1.
Example #2, with bank 1 updates enabled, a write operation is directed to bank 1 (reference FIG. 5D, ROW 4):
First:
    SWR=0, BSP=0, WRSEL=1, WAE=0, FSEL=1, ALTBANK=0, WRGATE=1
Then:
    PVE=1, CE0=1, CE1=1, OE=1, WE=1
Then:
    WAE=0, WRSEL=0, Then: PVE=0
At this point, the system waits a specified period of time (delay) for the +12 V Vpp 532 voltage to stabilize.
Then:
    The processor 202 initiates a write cycle of the desired data.
Then:
    WRGATE=0, SWR=1, FSEL=0
Then:
    CE0=1, WE=0, PVE=1, CE1=0, OE=1
At this point, the data is written until WRGATE goes to 1.

Figure 11A:
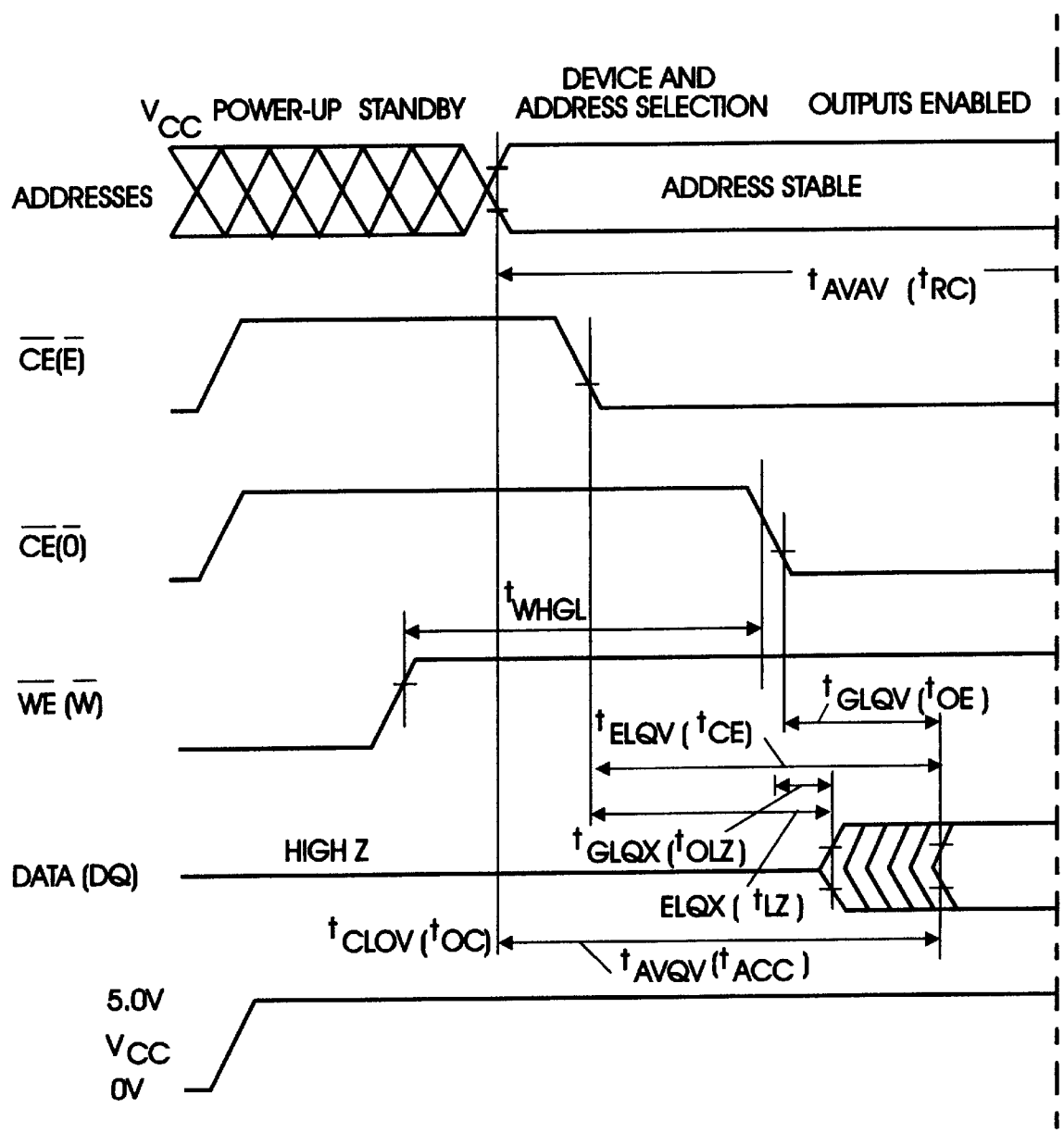
FIG. 11A, comprising FIGS 11A1–2 FIG. 11B, comprising FIGS. 11B1, and FIG. 11C, comprising
Figure 11C:
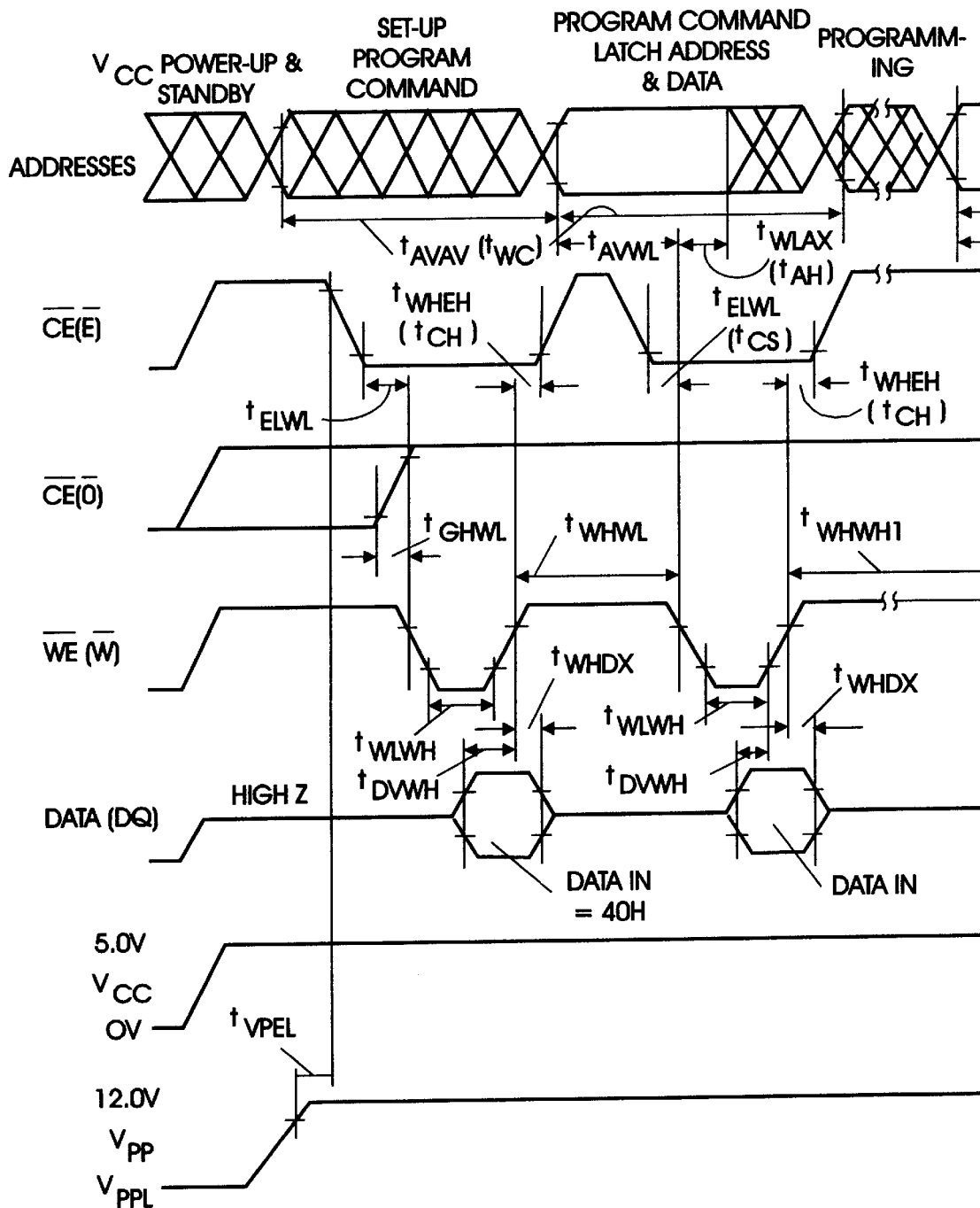

See FIGS. 11A, 11B, and 11C for graphs of waveforms for various signals used for reading from and writing to a single Flash memory device, e.g., the bank 504. Further, see the chart of FIG. 5D which shows the read and write conditions of the banks 502, 504 dependent upon the input signals BSP, ALTBANK, WAE to the enable logic device 500.

Referring again to FIG. 5B, the banks 502, 504 are not required to be physically separate parts. A part can be built which represents the logical functions of the two banks 502, 504 while being packaged as a single device. The parts can be repackaged for purposes which can include reduced cost and reduced board space.

The Bank Select and Protect (BSP) Signal Generator 600 of FIG. 5B determines which bank, either the bank 0 502 or the bank 1 504, is selected as the "base", cold-start or default bank. The BSP Signal Generator 600 also includes a "timeout" feature or timeout means. The timeout feature works in conjunction with POST to select the base bank. When the computer system 100 is first powered on, the BSP Signal Generator 600 will by default automatically select, for example, the bank 0 502 as the base bank. If POST does not "accept" this setting in a predetermined amount of time, the hardware of the generator 600 automatically changes the base bank selection to the bank 1 504 and restarts the processor 202. POST considers the firmware in the current bank as "acceptable" if such firmware passes a validity check, such as a checksum, which must result in a predetermined value. POST accepts a BSP setting by canceling the timeout used to automatically perform a new selection. The timeout means is more fully described in conjunction with FIGS. 6A, 6B, and 6D. This automatic reselection allows for the system 100 to recover from an invalid firmware image in the bank 0 502 or allows for the write-protect setting to be applied to the bank 1 504 for updating the bank 0 502.

Figure 6A:
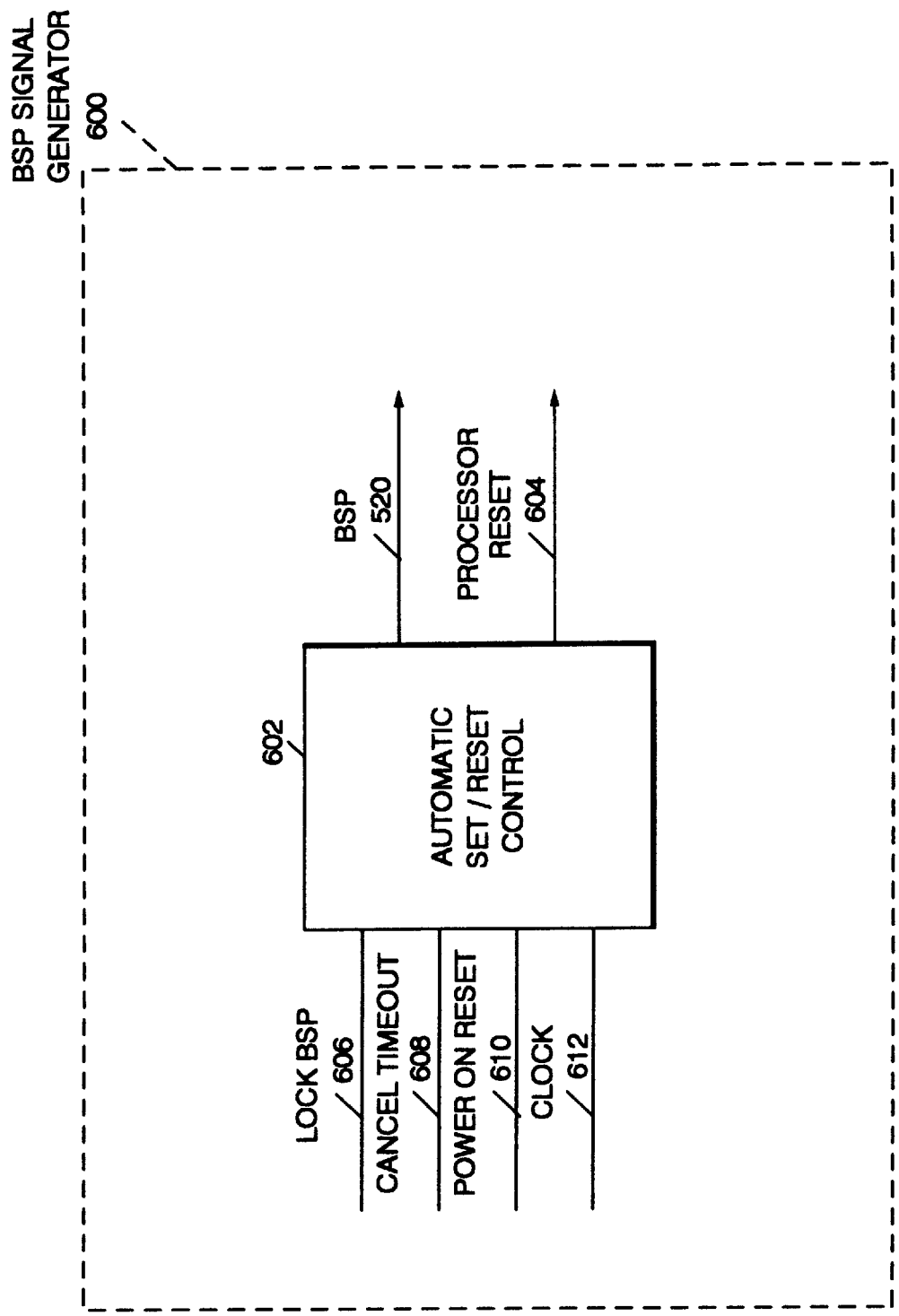
FIG. 6A is a block schematic diagram of an apparatus for generating a signal at the BSP input of an enable logic device of the control means and for generating a signal at the Processor Reset input of the system processor.

Referring now to FIG. 6A, there is shown a schematic diagram of the apparatus 600 for automatically generating the BSP 520 signal, the BSP Signal Generator 600. The Generator 600 includes an Automatic Set/Reset Control 602 having a first plurality (e.g., four) of input lines 606, 608, 610, 612 and a second plurality (e.g., two) of output lines 520, 604. The input lines 606, 608, 610, 612 and the output line 604 are suitably electrically connected to the control component or lines of the bus 234 (FIG. 2) or the bus 418 (FIG. 4). The Generator 600 also includes various generators of the input signals LOCK BSP, CANCEL TIMEOUT, POWER ON RESET, CLOCK. The two output signals, BSP 520 and Processor Reset 604, are shown controlled by the Automatic Set/Reset Control device 602. The BSP signal 520 indicates to the Enable Logic 500 of FIG. 5B which of two possible firmware banks should be selected as the "base," cold-start or default bank. The Processor Reset signal on the line 604 is connected to the control component of the bus 234 or 424. The Processor Reset signal 604 is an output signal which when driven active indicates that the system processor 202, but not the remainder of the computer system, should be reset. When the system processor 202 is reset, it will restart execution at a predefined location in the firmware subsystem 242. The Automatic Set/Reset Control has as inputs Lock BSP 606, Cancel Timeout 608, Power On Reset 610, and Clock 612 signals. After a system reset, the Cancel Timeout 608 and the Lock BSP 606 signals are required to be a logical zero. The signals 606, 608 are supplied from a control part of the memory control unit 252 and are under direct program control.

The Lock BSP 606 signal locks the BSP 520 output signal in its currently defined state for the duration of the current power-on cycle. Once locked, the BSP 520 signal cannot be changed until power to the device 602 is turned off and then back on again. The BSP 520 signal is locked to ensure that only one of the banks 502 or 504 can be altered during a single power-on session. This locking provides an added level of system integrity. Once the BSP 520 signal is locked, a fixed selection is made as to which bank is the "base" bank and write-protected. Once the "base" bank is selected, the bank which is not the base bank is then the alternate-bank. The Cancel Timeout 608 signal cancels any currently active timeout sequence. This timeout sequence provides a means for automatically altering the bank selection (through the BSP signal) and automatically restarting the processor, thus beginning system initialization again but with a different bank of firmware. A valid POST would cancel the timeout before it occurred so as to prevent the occurrence of a different bank selection. An invalid POST would not cancel the timeout or would not be able to cancel the timeout so that the timeout means would select the other, and valid firmware, bank. The Power On Reset 610 signal is an input generated from a system power supply (not shown). The Power On Reset 610 signal is driven active once system power has reached a specified level, and held active for a specified period of time so that all computer system components may be initialized. The Power On Reset 610 signal then goes inactive and remains inactive until system power is interrupted. The Power supply and its operation are conventional and well known. The Clock 612 signal is generated by a system oscillator 207 running at a fixed frequency. A typical value for the Clock 612 frequency is, e.g., 25 megahertz.

Figure 6B:
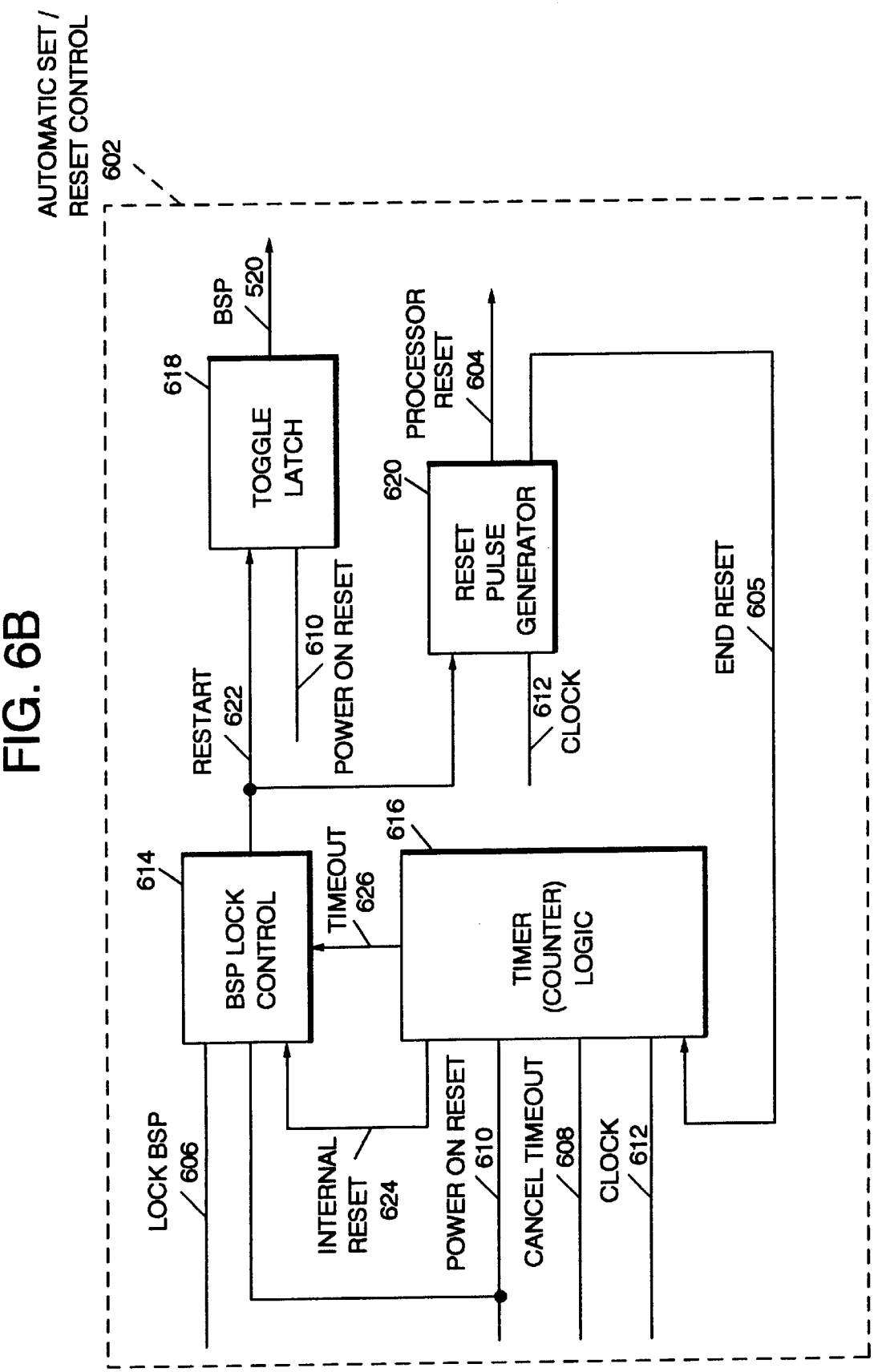
FIG. 6B is a more detailed block schematic diagram of the signal generator of FIG. 6A.

FIG. 6B shows the preferred embodiment of the Automatic Set/Reset Control logic device 602 in more detail. The Automatic Set/Reset Control 602 logic device includes, for example, a BSP Lock Control 614, a Timer (Counter) Logic 616, a Toggle Latch 618, and a Reset Pulse Generator 620 connected as shown. Signals internal to the Automatic Set/Reset Control 602 are End Reset 605, Internal Reset 624, Timeout 626, and Restart 622. End Reset 605 is an output of the Reset Pulse Generator 620 which signals the completion of the processor reset action to the Timer (Counter) Logic 616. Internal Reset 624 is an output of the Timer (Counter) Logic 616 and, when active, is used by the BSP Lock Control 614 to initialize to a known state. Timeout 626 is an output of the Timer (Counter) Logic and when active indicates to the BSP Lock Control 614 that a timeout has occurred and that a firmware restart sequence is required. Restart 622 is an output of the BSP Lock Control 614 and, when active, causes the Toggle Latch 618 to toggle the BSP 520 signal and, thus, a Processor Reset 604 to occur.

Figure 6C:
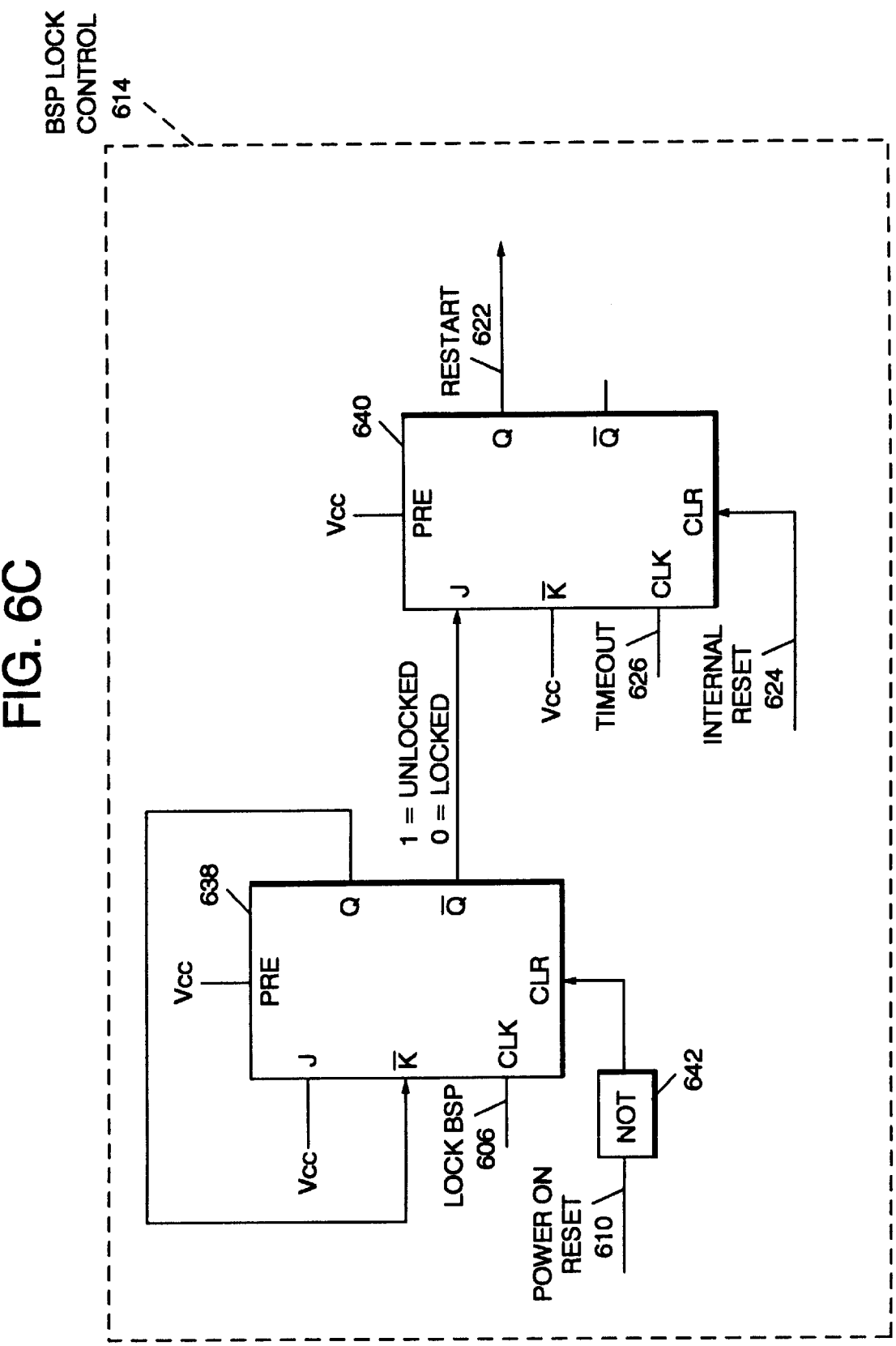
FIG. 6C is a more detailed block schematic diagram of the BSP Lock Control of FIG. 6B.

FIGS. 6C, 6D, 6E, and 6F use Ground (GND) to indicate system ground which is a logical zero and Vcc to indicate system power which is a logical one. Referring now to FIG. 6C, there is shown a block schematic diagram of the BSP Lock Control 614 Logic. The BSP Lock Control 614 Logic includes two standard J-K Flip-flops 638, 640 and one NOT (inverter) gate 642. A preceding tilde "~" notation is being used in place of the more traditional overbar notation to indicate NOT or inverse. These elements 638, 640, 642 are connected as shown. The first J-K flip-flop is cleared by the Power On Reset 610 signal, after the Power On Reset 610 signal passes through the inverter 642. This will initialize its Q output to the Logic 0 state. The J input is connected to the Vcc terminal to establish a Logic 1 state, while the K input is connected in a feedback loop from the Q output. Thus, immediately after Power On Reset 610, the K input will be at the logic 0 state. A truth table (FIG. 12) for the J-K flip-flop shows that once this state is established on the J and K inputs, and upon receiving a positive going transition on the Lock BSP 606 signal, the Q output will toggle, thus changing Q to the 1 state. Further examination of the truth table for this J-K flip-flop reveals that at this new state (J=1, K=1), subsequent transitions on the Lock BSP 606 line will continue to keep the Q output in the high state. Thus, this flip-flop 638 can only change its state from the (J=1, K=1) state by receiving an active input on its clear (CLR) input, which is derived directly from the Power On Reset 610 signal. Notice also that the Q output of this flip-flop follows as the logical inversion of the Q output. The ~Q output of the first flip-flop 638 is connected to the J input of the second flip-flop 640. The K input of this flip-flop 640 is connected to the logically high Vcc terminal, as is the "Preset" (PRE) input. The clock (CLK) input is connected to the Timeout 626 signal, while the clear (CLR) input is connected to the Internal Reset 624 signal line, as previously described. The Q output is the Restart signal 622.

In operation, the flip-flop 640 is initialized as a result of the Internal Reset 624 signal. This establishes the Q output 622 at the logical 0 state. The flip-flop 640 will now respond to a clock input (Timeout 626) in one of two ways. If the J input is 1 (as is normal after a power on reset), a rising edge of the Timeout 626 signal will force the Q output to the logic 1 state, as is shown in the truth table. This indicates to other devices that the Restart 622 state is active. If, however, the J input is 0 at the time of the Timeout 626 signal rising transition, the Q output will remain in its current state 0.

The combination of these two flip-flops, in the described connection shown in FIG. 6C, establishes the following operation for the BSP LOCK control 614:

After a Power On Reset 610, a Timeout 626 low-to-high (0 to 1) transition, prior to a low-to-high Lock BSP 606 transition, will indicate a Restart 622.

After a low-to-high Lock BSP 606 transition, any Timeout 626 transitions will be ignored.

After a low-to-high Lock BSP 606 transition, a Power On Reset 610 will be required to create a low-to-high transition on the Restart 622 line.

This operation establishes that the Timeout 626 signal will be capable of generating a Restart 622 condition as long as the Lock BSP 606 signal remains inactive. However, after any low-to-high transition on the Lock BSP signal, the Restart 622 line can no longer be activated until the Power On Reset 610 signal resets the BSP Lock Control 614 logic. The BSP Lock Control 614 logic includes, for example, standard commercially available TTL parts such as the Texas Instruments SN74ALS109A for the J-K flip-flops 638, 640, and the Texas Instruments SN74ALS04 for the inverter 642. Of course, equivalent logic using other logic implementations, both discrete and VLSI components, could be utilized.

Figure 6D:
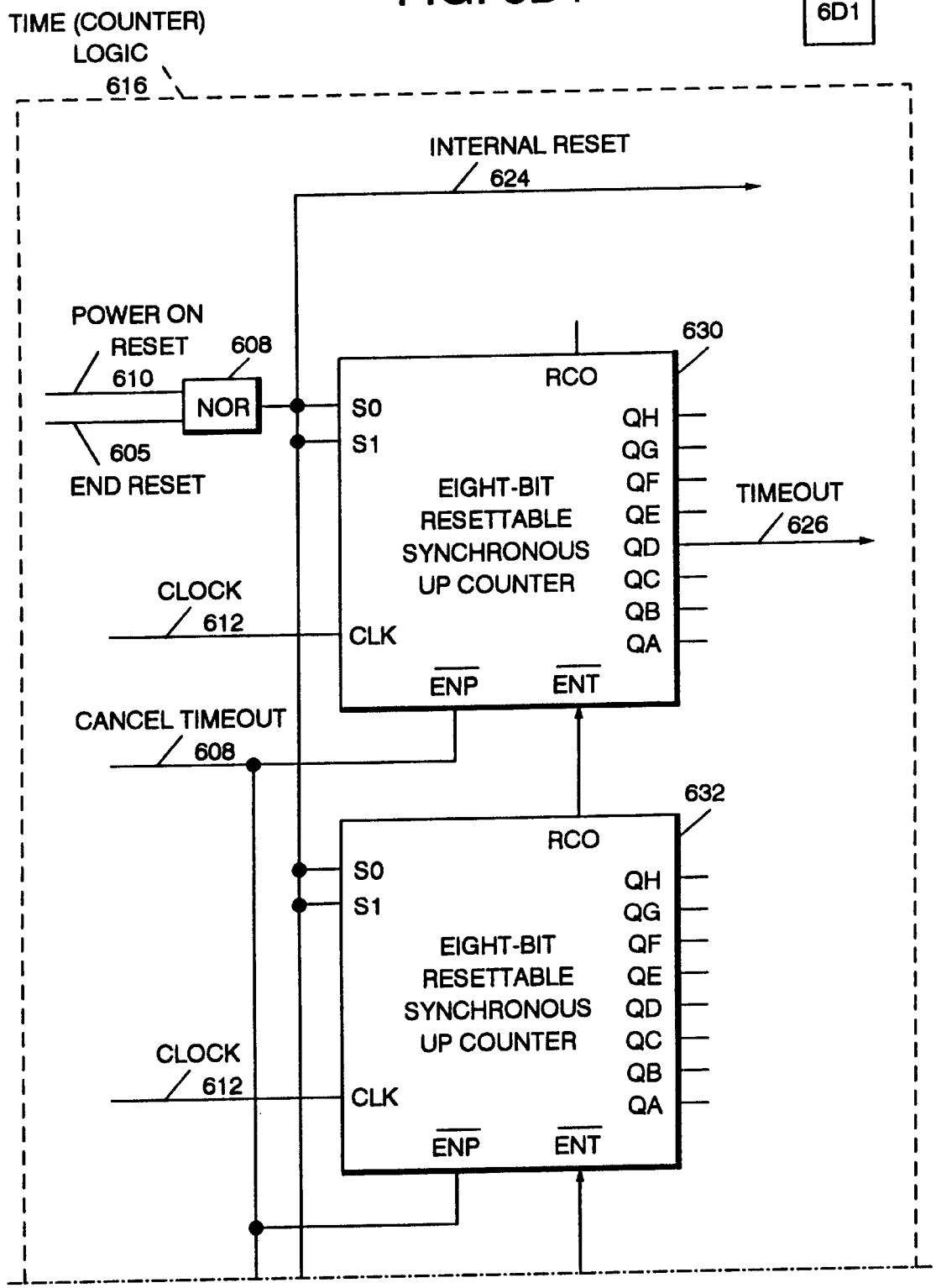
FIG. 6D, comprising

Referring now to FIG. 6D, there is shown a block schematic circuit diagram of the Timer (Counter) Logic 616 for generating the Timeout 626 signal. This circuit includes four separate 8-bit binary resettable synchronous up counters 630–636 and a single two-input NOR gate 628. The four counters are connected in a standard cascade arrangement, so that they are linked together to act as a single 32-bit counter. The NOR gate combines the Power On Reset 610 signal with the End Reset 605 signal. The output of the Logical NOR is the Internal Reset 624 signal, which is used within the Timer (Counter) Logic 616 to reset the counters, and is also an output 624 of the Timer (Counter) Logic 616. The counters 630–636 are initialized to zero by this Internal Reset 624 signal via the respective 8-bit Counter lines S0 and S1. Two additional inputs on the counters, ENT and ENP, must be low to gate the counters on.

The ENP input on each stage is connected to the Cancel Timeout 608 signal. Cancel Timeout 608 effectively controls whether or not the counters are counting. The ENT input on the three upper stages 630–634 is connected to the previous stage's ripple carry out (RCO). This ENT and RCO combination completes the cascade connection of the four stages.

After exiting the reset state, the counters increment their outputs at the Clock 612 rate in standard binary counter format. Thus, the lowest order bit (or least significant bit LSB) will toggle at half the rate of the CLK clock input. The output bit QA is the least significant bit and QB the next significant bit and so on. The bit QH is the most significant bit. Each higher order bit will toggle at half of the previous bit's rate, and so on. This operation is typical of a standard digital binary counter and is well known in the art.

Because Timeout 626 is connected to the twenty-eighth output bit of the counter array, Timeout 626 will go active after $(2^{**}27)-1$ input clocks. With a 25 megahertz Clock 612, the Timeout 626 output will go active in approximately 5.37 seconds. The selection of 5.37 seconds is discussed in greater detail in conjunction with FIG. 7. At any time during the counting operation, a logical high level on the Cancel Timeout 608 input will suspend the counting. The use of this signal is also discussed in conjunction with FIG. 7. The Timer (Counter) Logic 616 includes, for example, standard TTL parts such as four Texas Instruments SN74ALS867 counters and a Texas Instruments SN74ALS02 quad dual input NOR gate. These parts are commercially available, or the equivalent logic may be made from other logic implementations, both discrete and VLSI components, as is well known in the art. The synchronous nature of the counter shown here is also not critical; for instance, a ripple counter or other timing device may produce a similar output 626. Also, the particular count duration or time duration of the Timeout 626 signal, as produced by the counter 616, may be varied according to the application by selecting other counter outputs or combinations of the counter outputs to produce the desired result.

Figure 6E:
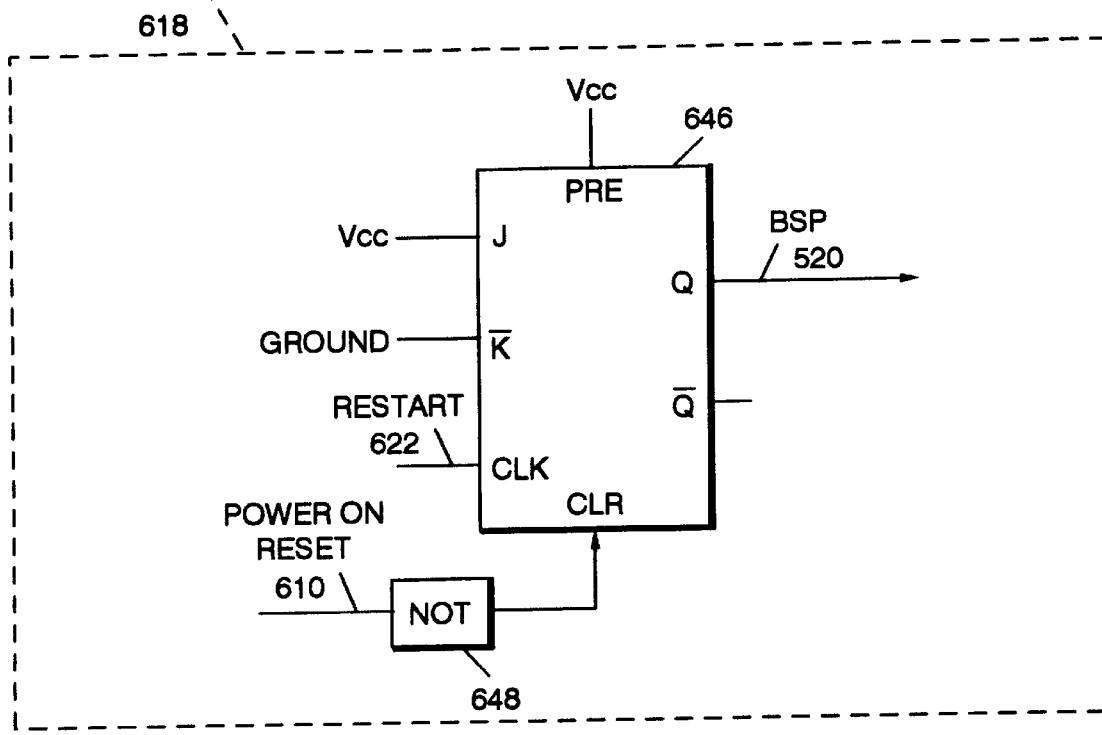
FIG. 6E is a more detailed block schematic diagram of the Toggle Latch of FIG. 6B.

Referring now to FIG. 6E, there is shown a block schematic diagram of the Toggle Latch 618 Logic device. The Toggle Latch 618 Logic device includes a standard J-K flip-flop 646 and an inverter 648. In this application, the J-K flip-flop is wired for toggle mode operation. The J input is connected to the Vcc node to establish a Logic 1 input, and the K input is connected to GND, to establish a logic 0 state. The flip-flop 646 is cleared by a signal that is the NOT of the Power On Reset 610 signal. Thus, the Q output (the BSP 520 signal) will be initialized to 0 after each power on reset sequence. The toggle operation occurs whenever a low-to-high (logical 0 to logical 1) transition occurs on the Restart 622 input. This transition causes the Q output (BSP 520) to toggle to the logically opposite state. The Toggle Latch 618 logic device includes, for example, standard TTL parts such as the Texas Instruments SN74ALS109A for the J-K flip-flop, and the Texas Instruments SN74ALS04 for the inverter 648. These parts are commercially available. It should also be obvious that equivalent logic could result from other logic implementations, both discrete and VLSI components.

Figure 6F:
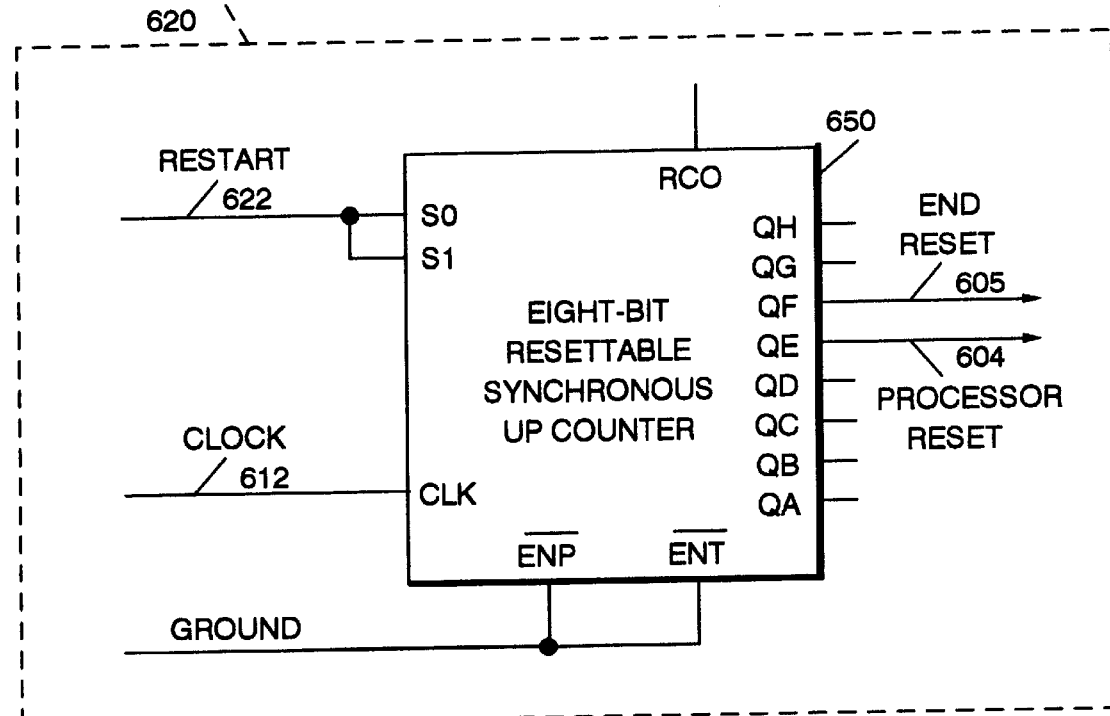
FIG. 6F is a more detailed block schematic diagram of the Reset Pulse Generator of FIG. 6B.

Referring now to FIG. 6F, there is shown a block schematic diagram of the Reset Pulse Generator 620. The logic of the Reset Pulse Generator 620 generates a fixed width output pulse (Processor Reset) 604 when signalled by a high state on the Restart 622 input. The Reset Pulse Generator 620 includes, for example, a standard counter that is well known in the art. The Reset Pulse Generator 620 includes, for example, an 8-bit resettable synchronous up counter 650. The counter 650 is clocked with the Clock 612 signal, as previously described. The Restart 622 input, when low, clears the counter to the 0 count. Note that this also clears the QF output, End Reset 605, to the low state. When Restart 622 is high, the counter is enabled to count up. When the Restart 622 input goes high, the counter begins counting. After 24 clocks (16 clocks), the QE output (Processor Reset 604) goes high. It will remain in this high state for an additional 16 clocks. After a total of 32 clocks, the QE output will go low, and the QF output, End Reset 605, will go high. Recall that End Reset 605 signals the completion of the processor reset action to the Timer (Counter) Logic 616 of FIG. 6B. The Reset Pulse Generator 620** logic includes, for example, standard TTL parts such as the Texas Instruments SN74ALS867 for the counter. This part is commercially available. It should also be obvious that equivalent logic could be realized using other logic implementations, both discrete and within VLSI components, as is well known in the art.

Description of Operation

We now discuss four cases describing the operation of the firmware subsystem 242. The first case #1 is a computer system 100 including two firmware banks 502, 504 each containing an identical program code image (i.e., identical firmware). This is a typical case at time of computer system 100 manufacture. Referring now to the flowchart of FIG. 7, the initialization of computer system 100 will be described. Only actions relevant to the operation of the firmware subsystem 242 will be discussed. Case #1 describes the usual actions taken in a properly configured system. First, the computer system 100 is powered on and the processor 202 begins attempting to fetch program code from a predetermined address in the bank 0 502. Because the firmware is mapped into this predetermined address space and because the bank 0 502 is the default active bank at power-on, the processor 202 obtains the program code from the bank 0 502. Because case #1 describes a properly configured system, processor 202 successfully obtains POST program code from bank 0 502. The POST performs some preliminary initialization, step 700, such as checking the processor 202 status. The type and scope of these early tests are matters of design choice.

After the early initialization of step 700, POST checks the BSP bit, step 702, to ascertain if it is in the locked state. BSP locked indicates that the system has already been powered on and that POST is simply being reentered. With BSP locked, bank selection is already complete and POST continues at step 730. However, case #1 describes the normal power on sequence so the check of BSP being locked in step 702 would indicate that BSP is not locked. Next, POST checks the bank 0 502 firmware for validity. The validity check, step 704, on the bank 0 502 can be a checksum procedure which must result in a predetermined value. For example, an eight-bit running sum of every byte in the firmware image can be computed and compared to zero, and if found to be zero the firmware image would be considered valid. Other forms of validity checks can include a cyclic redundancy check (CRC). The type of validity test, if one is used at all, is a matter of well-known design choice.

If the firmware of the bank 0 502 were found to be invalid, then the POST would halt and wait for the Automatic Set/Reset Control 602 logic to toggle to the bank 1 504 and restart the processor 202, step 718. If bank 0 502 is found to be valid, then POST cancels the timeout, step 706. POST cancels the timeout by setting Cancel Timeout 608 which is done through an I/O port under direct program control. The previously described 5.37 second timeout value is chosen as an adequate amount of time for POST to begin execution from reset and check the validity of a firmware bank and, if desired, to cancel the timeout. POST then checks the contents of NVRAM for validity, step 708. Once again, a checksum or other procedure can be used to ascertain if the data stored in NVRAM is valid. If the contents of NVRAM are found to be not valid in step 708, then a configuration error exists 720 and the system proceeds to step 716 where the BSP signal is locked. The BSP signal is locked by setting the Lock BSP 606 bit and is done through an I/O port under direct program control.

If the contents of NVRAM are found to be valid in step 708, then an Update-Phase indicator (described in more detail hereinafter) stored in NVRAM is checked for a value of zero. If the Update-Phase indicator is found to be zero in step 710, then POST initializes a small section (64K) of system RAM and copies a portion 712, 714, 728 of the bank 0 502 code into that small section of system RAM. POST in the bank 0 502 then transfers control to this small section of POST in system RAM. The POST code in system RAM, shown in FIG. 7, then checks bank 1 504 for validity, step 712. If bank 1 504 is not valid, then there is a firmware bank error 728 and POST proceeds to lock the BSP signal, step 716. If bank 1 504 is valid in step 712, then the version codes of both the bank 0 502 and the bank 1 504 are compared, step 714. This version comparing can be of, for example, a version number, a sequence number, or a date value. The nature of the means to track versions is a matter of well-known design choice. A convenient version code is the date included at a fixed location near the end of every IBM personal computer firmware image.

If the firmware of bank 1 504 is found to be newer than the firmware of bank 0 502, then this is also a firmware bank error, step 728. This is an error because the Update-Phase indicator was not in a state which allows the firmware of the bank 1 504 to be newer than the firmware of the bank 0 502. If the firmware of the bank 1 504 is found to be not newer than the firmware of the bank 0 in step 714, then the BSP signal is locked, step 716, and POST proceeds with system initialization, step 730. Locking the BSP signal in step 716 prevents the BSP signal from being changed during the remainder of computer system operation. The BSP signal can once again be changed when the system is powered off and then powered on.

Case #2 is a case wherein the firmware of the bank 0 502 is corrupted or found to be invalid by POST. If the firmware of the bank 0 502 contains no program code, such as would be case if an update operation were interrupted by a power outage, then a cancel timeout 706 will not occur. As a result, the Automatic Set/Reset Control 602 will automatically select the bank 1 504 and automatically reset the processor 202. If the bank 0 502 does contain some POST code but is not entirely valid, then the previously described steps of 700, 702, 704, 718 would occur.

Case #3 is a case wherein the firmware of the bank 1 504 is corrupted or found the be invalid by POST. This case was previously described by the steps 700, 702, 704, 706, 708, 710, 712, 728, 716, 730.

Before proceeding with case #4, we will outline the update operation as it relates to the Update-Phase indicator. An update will occur in two basic phases. Phase A is a phase wherein the firmware of the bank 1 504 is updated and Phase B is a phase wherein the firmware of the bank 0 502 is updated. The Update-Phase indicator stored in NVRAM is used to track the progress of the update procedure and is used by both POST and the update program. When the Update-Phase indicator equals zero, the system is not currently in an update operation. When Update-Phase indicator equals one, the update program has completed programming the bank 1 504 with new firmware. When the Update-Phase indicator equals two, POST has locked down the bank 1 504 and the bank 0 502 is ready to accept an update.

Figure 8:
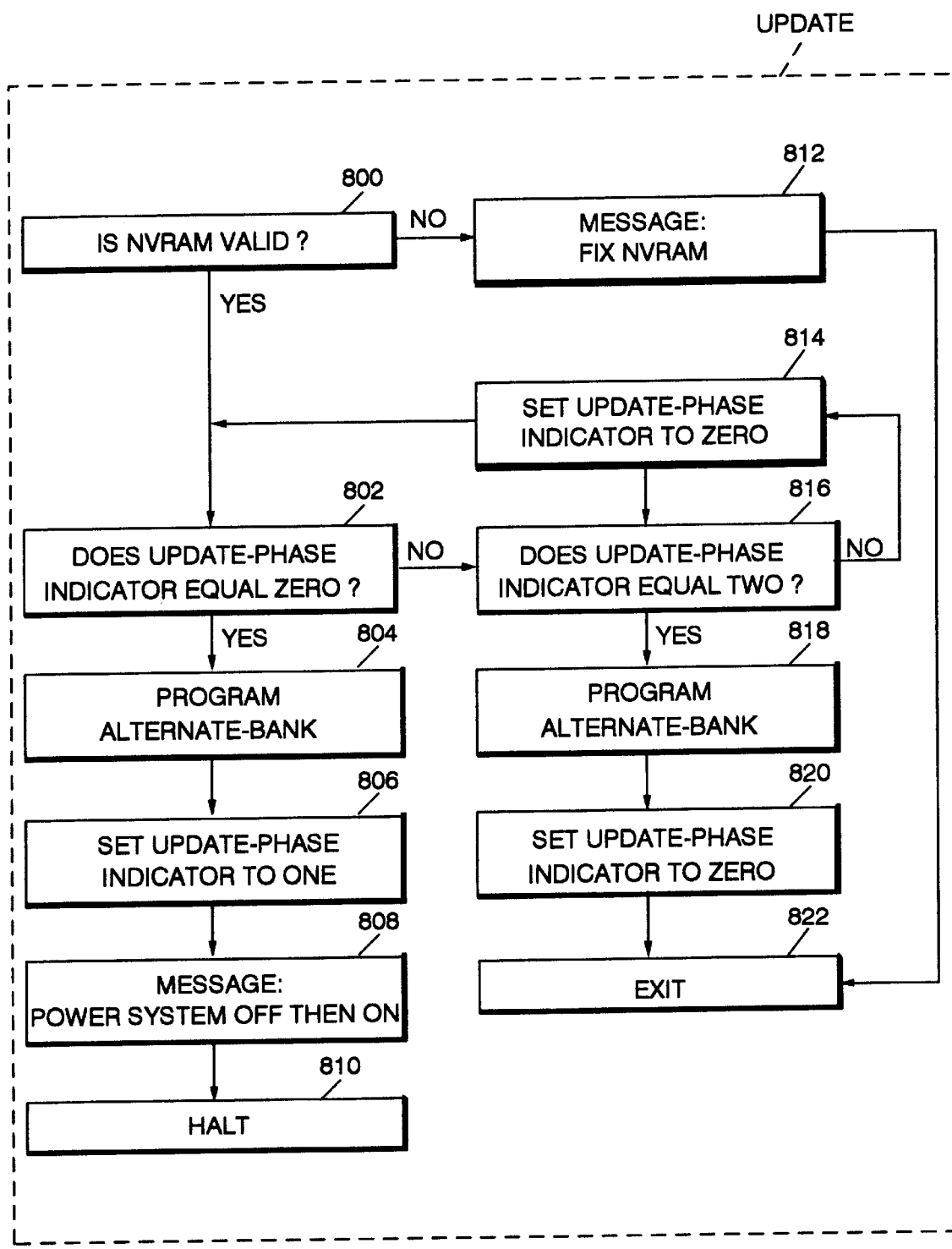
FIG. 8 is a flow diagram of a system firmware modification procedure.

Referring to FIG. 8, the operation of the update procedure is described. An understanding of FIG. 8 will assist in the further description of FIG. 7 and the remaining case (#4). Once the update program is running, the Update program checks the contents of NVRAM for validity, step 800. If the contents of NVRAM are not valid, then the user is instructed to Fix NVRAM, step 812, before the update procedure can continue. "Fixing" NVRAM can be accomplished through running a Setup program which is distributed on the Reference Diskette of all PS/2 systems and is well known. Setup is described, for example, in *IBM Personal System/2 Hardware Interface Technical Reference Architectures*, pages 1–54, which is hereby incorporated by reference. With invalid NVRAM contents, the update program then exits, step 822. When the contents of NVRAM are found to be valid in step 800, the Update-Phase indicator is checked for a value of zero, step 802. If the Update-Phase indicator is zero, then the update program can proceed to the step 804 where the Alternate-Bank is reprogrammed. The update program then sets the Update-Phase indicator to one, step 806, indicating that the Phase A (as described above) is complete. The update program then instructs the user to power the computer system 100 off and then on, step 808, and halts, step 810, waiting for the user to power the system off.

Referring back to FIG. 7, case #4 will now be described. With the Update-Phase indicator equal to one, the steps 700, 702, 704, 706, 708 occur as described previously. At step 710, the Update-Phase indicator is found to be nonzero and control passes to the step 722. In step 722, Update-Phase indicator is checked for a value of one. In this case, the Update-Phase is one so the Update-Phase indicator is set to a value of two, step 724. POST then engages the timeout apparatus and halts, step 726, waiting for the computer system to be restarted with the BSP 520 bit toggled. Once the system is reset and POST restarts, the steps 700, 702, 704, 706, 708, 710 are again executed. In step 722, the Update-Phase indicator will not equal one so that control passes to step 716 where BSP is locked, thus establishing the bank 1 504 as write protected and the bank 0 502 as the Alternate-Bank.

Referring again to FIG. 8, the update program is once again executed—because the Update-Phase indicator requires further update processing. When POST ascertains that an update procedure is in progress, POST will require a Reference Diskette boot in order to complete the update operation. The contents of NVRAM are found to be valid in step 800. The Update-Phase indicator is checked in step 802 and not found to be zero because it is two. The Update-Phase indicator is then checked in step 816 for a value of two and is found to be two. If Update-Phase were not two, then control would be passed to the step 814 where the Update-Phase indicator would be reset to zero and the update procedure reinitiated. With Update-Phase indicator equal to two in step 816, control passes to step 818 where the Alternate-Bank, now the bank 0 502, is programmed with the firmware image. Next, the Update-Phase indicator is set to zero, step 820, indicating that the update phases are complete. The update program then exits, step 822. There is no need to restart the computer system at this point because the firmware in the bank 1 504 is the same as the firmware now in the bank 0 502. The bank 0 502 will be the bank selected by the BSP 520 signal after the next power on cycle. Finally, suitably coding all of the steps shown in FIG. 7 and FIG. 8 is well within the skill of the art in view of the instant specification.

The firmware subsystem 242 of the invention is also valuable during the time period in which the computer system is under development. With firmware in erasable programmable read only memory (EPROM), each firmware revision would need to be programmed or "burned" into the EPROM. The procedure to burn an EPROM entails first locating an EPROM of the correct type and then erasing it through exposing it to ultraviolet light in a special erasing device. The time to erase an EPROM may vary, but it can take over ten minutes. Then, the erased EPROM must be placed into another special device called an EPROM programmer. The new firmware program code must then be loaded into this EPROM programmer which is often a time consuming operation. Then, the EPROM programmer must be instructed to transfer or burn the loaded firmware code into the EPROM device. This operation takes yet more minutes to accomplish. Then, the EPROM device must be removed from the EPROM programmer and inserted into the system under test. To insert the new EPROM, the old EPROM currently in the system must be removed. The removal and insertion process of these devices sometimes results in damaged hardware. It should be appreciated that the firmware subsystem 242 of the present invention, in which it normally takes no more than 15 seconds to complete the reprogramming of the Alternate-Bank, can be utilized in the system development environment, and is a significant improvement over the old EPROM scenario.

While the present invention was described above, it will be understood by those skilled in the art that various changes in detail may be made without departing from the spirit, scope, and teaching of the invention. For example, while the preferred embodiment uses Intel processors and an IBM PS/2 MICRO CHANNEL bus for illustrative purposes, this invention can be implemented on other processors and/or bus types. Likewise, those skilled in the art will recognize that many elements of the invention can be implemented in hardware or software. Accordingly, the invention should be limited only as specified by the appended claims.

What is claimed is:

1. An apparatus for storing firmware, including:
a plurality of nonvolatile alterable electronic memory devices connected in an electrically mutually parallel circuit arrangement; each said memory device storing firmware for controlling operation of a computer system, each said memory device being reprogrammable while in a said computer system to store either the same said firmware or an updated version thereof, and each said memory device being of a type which is potentially vulnerable to loss of data while the device is being reprogrammed; and control means electrically connected to said memory devices for automatically and selectively controlling the accessibility of said memory devices to be read or written by a said computer system, such that at any instant of time only a single selected one of said memory devices is enabled to be accessed by said computer system at any time, and such that said selected one of said memory devices is adaptively selectable by said control means in response to conditions encountered during startup of a said computer system: whereby, a said memory device first selected during said computer system startup and having invalid firmware can be automatically replaced by another of said memory devices prior to completion of said startup.

2. An apparatus as claimed in claim 1, wherein said control means includes means for conditionally write protecting said memory devices such that a said selected memory device that is currently enabled for read or write access by a said computer system can be reprogrammed to contain a new copy of said firmware only by a party having a special authorization identity.

3. An apparatus as claimed in claim 1, wherein said control means includes means for automatically controlling enablement of said memory devices to be written to, and thereby reprogrammed, by a said computer system, such that a single selected one of said devices can be reprogrammed without affecting the memory content of any other said memory devices.

4. An apparatus as claimed in claim 3, wherein said means for controlling reprogramming access to said memory devices further includes means for automatically write protecting the memory content of said any other memory devices.

5. An apparatus as claimed in claim 3, wherein said memory devices are configured by said control means into an active/standby configuration in which only a single selected one of said memory devices is active relative to a respective said computer system at any instant of time, and only said single selected one of said memory devices is being used to furnish firmware to said computer system; and wherein any other one of said memory devices, that is not currently selected, is available, on a standby basis, to be selected to replace said single selected one of said one memory devices.

6. An apparatus as claimed in claim 5, wherein said control means includes an enable logic device having outputs connected to said memory devices and having an input connected to a signal generator, said logic device including logic for selecting different ones of said memory devices, as said single selected one of said memory devices, in response to signals from said signal generator.

7. An apparatus as claimed in claim 6, wherein said enable logic device further includes selective write enabling logic for enabling said any other one of memory devices to be reprogrammed while simultaneously preventing alteration of the memory content of said single selected one of said memory devices.

8. An apparatus as claimed in claim 6, wherein said signal generator includes means for automatically selecting said another of said memory devices.

9. An apparatus as claimed in claim 6, wherein said signal generator includes means for generating a processor reset signal.

10. An apparatus as claimed in claim 1, wherein said control means is adapted for performing a Bank Check and Select function, relative to said any other one of said memory devices, for generating a validity check on the memory content of said any other one of said memory devices, for ascertaining a characteristic of said memory content, and for selecting said one or said another memory device dependent upon said characteristic.

11. An apparatus as claimed in claim 10, wherein said firmware is available in a number of different versions and said characteristic is indicative of a specific one of said different versions.

12. An apparatus as claimed in claim 10, wherein said Bank Check and Select function is defined by the firmware stored within said single selected one of said memory devices.

13. A personal computer system having an alterable firmware store, comprising:
a processor;
an electronic volatile memory, said memory being electrically connected to said processor;
a plurality of alterable electronic nonvolatile memories connected in a mutually parallel circuit arrangement, said nonvolatile memories being electrically connected to said processor and to said volatile memory;
firmware stored within each of said nonvolatile memories; said nonvolatile memories being reprogrammable by operations of said computer system, and also being of a type which is vulnerable to potential loss of firmware data while being reprogrammed,
means for automatically controlling access to said nonvolatile memories to permit an alteration of said firmware stored within one of said nonvolatile memories, while preventing alteration of said firmware stored within any other one of said nonvolatile memories.

14. A personal computer system as claimed in claim 13, wherein said means for automatically controlling access to said nonvolatile memories includes means for controlling reprogramming access to said one of said nonvolatile memories to allow for alteration of the firmware stored within said one nonvolatile memory.

15. A personal computer system as claimed in claim 14, wherein said altering means includes an update enable code for allowing alteration of firmware stored within said one nonvolatile memory.

16. A personal computer system as claimed in claim 15, wherein said update enable code includes a plurality of code elements, including one element for selecting said one nonvolatile memory as an active memory, another element for enabling said one nonvolatile memory to receive a new firmware image, and yet another element for enabling writing of said new firmware image into said one nonvolatile memory.

17. A personal computer system as claimed in claim 16, wherein said firmware includes a Bank Check and Select Code for checking a validity of firmware stored in a selected one of said memory devices, for ascertaining a characteristic of the said stored firmware, and for selecting either said one memory device containing said checked firmware or another one of said memory devices other than said device containing said checked firmware as the source of firmware to be read out to said computer system when said system is fully operational, in functional dependence upon said checked characteristic.

18. A personal computer system as claimed in claim 17, wherein said firmware includes a POST program for checking said computer system when said system is booted up, and wherein said Bank Check and Select Code is a part of said POST program.

19. A method as claimed in claim 17, further comprising storing complete firmware images respectively within the one and the another of the memory banks prior to said first selecting step.

20. A method as claimed in claim 19, wherein the complete firmware images are identical.

21. A method for accessing firmware in a personal computer system, comprising:

automatically first selecting one of a plurality of memory banks, each having respective firmware stored therein as a source of firmware to be read out to the respective computer system: each of said memory banks of said plurality of memory banks comprising a nonvolatile memory device that is reprogrammable to contain a new version of said firmware, and each said memory device being of a type which is vulnerable to potential loss of data while the device is being reprogrammed;

checking a validity of the firmware stored in another one of said memory banks;

comparing a characteristic of the firmware stored in said one of said memory banks with a characteristic of the firmware stored in said another one of said memory banks to produce a result;

second selecting between said one and said another one of said memory banks as the said source of firmware to be read out to said computer system dependent upon the result of said comparing step.

22. A method as claimed in claim 21, further comprising copying the firmware from said bank selected in said second selecting step into a volatile memory of said computer system.

23. A method as claimed in claim 21, further comprising:

enabling said another one of said memory banks to receive a new firmware image and then;

writing the new firmware image into said another bank.

* * * * *